(12) United States Patent
Choi

(10) Patent No.: US 11,465,664 B1
(45) Date of Patent: Oct. 11, 2022

(54) BABY WAGON WITH IMPROVED EASE OF USE

(71) Applicant: BRAN-NEW INTERNATIONAL, Seoul (KR)

(72) Inventor: Yejin Choi, Busan (KR)

(73) Assignee: BRAN-NEW INTERNATIONAL, Seoul (KR)

( * ) Notice: Subject to any disclaimer, the term of this patent is extended or adjusted under 35 U.S.C. 154(b) by 0 days.

(21) Appl. No.: 17/545,623

(22) Filed: Dec. 8, 2021

(51) Int. Cl.
*B62B 7/06* (2006.01)
*B62B 7/14* (2006.01)
*B62B 7/00* (2006.01)

(52) U.S. Cl.
CPC ............... *B62B 7/06* (2013.01); *B62B 7/008* (2013.01); *B62B 7/14* (2013.01)

(58) Field of Classification Search
CPC .............. B62B 7/06; B62B 7/008; B62B 7/14
See application file for complete search history.

(56) References Cited

U.S. PATENT DOCUMENTS

| | | | |
|---|---|---|---|
| 9,033,361 B2* | 5/2015 | Frankel | B62B 3/007 280/651 |
| 9,145,154 B1* | 9/2015 | Horowitz | B62B 3/02 |
| 9,896,118 B2* | 2/2018 | Choi | B62B 3/007 |
| 10,414,422 B2 | 9/2019 | Choi | |
| 10,464,588 B1* | 11/2019 | Lin | B62B 7/08 |
| 10,988,153 B1* | 4/2021 | Horowitz | B62B 7/008 |
| 2003/0025301 A1* | 2/2003 | Banuelos, III | B62B 3/022 280/47.38 |
| 2008/0073880 A1* | 3/2008 | Bess | B62B 3/02 280/651 |
| 2010/0156069 A1* | 6/2010 | Chen | B62B 9/142 280/639 |
| 2014/0353945 A1* | 12/2014 | Young | B62B 5/08 280/650 |
| 2015/0035258 A1* | 2/2015 | Chen | B62B 3/007 280/651 |
| 2017/0259838 A1* | 9/2017 | Choi | B62B 3/007 |
| 2018/0118243 A1* | 5/2018 | Fitzwater | B62B 7/008 |
| 2019/0185038 A1* | 6/2019 | Choi | B60B 33/02 |
| 2020/0031376 A1* | 1/2020 | Horowitz | B62B 3/025 |
| 2021/0061331 A1* | 3/2021 | Wu | B62B 3/022 |
| 2021/0107551 A1* | 4/2021 | Sturgeon | B62B 3/025 |

FOREIGN PATENT DOCUMENTS

KR    10-1672853 B1    11/2016

* cited by examiner

*Primary Examiner* — Erez Gurari
(74) *Attorney, Agent, or Firm* — Novick, Kim & Lee, PLLC; Jae Youn Kim

(57) ABSTRACT

A baby wagon with improved ease of use includes a foldable main body frame, wherein the foldable main body frame includes a front main frame, a rear main frame, and a side frame, the baby wagon being configured such that the structure of the frames is simplified while stability and durability of the babe wagon are guaranteed, whereby the baby wagon is easily carried and stored, such that the number of unnecessary frames is reduced, whereby the overall weight of the baby wagon is reduced and production cost is reduced, and therefore product competitiveness is achieved, such that a change in shape of the baby wagon through folding and unfolding of the baby wagon is easily performed, and such that a canopy, a baby seat, and a tray may be conveniently detachably coupled to the foldable main body frame.

14 Claims, 26 Drawing Sheets

BABY WAGON WITH IMPROVED EASE OF USE

BACKGROUND OF THE INVENTION

Field of the Invention

The present invention relates to a baby wagon with improved ease of use configured such that the baby wagon is easily folded and unfolded in an easy way, such that a baby keeps a comfortable pose depending on physical conditions of the baby, such as age and physical growth of the baby, whereby the ride comfort of the baby is improved while the baby wagon is stably moved, and a frame coupling structure is reinforced, whereby allowable boarding load is increased while overall stability and durability of the frames are guaranteed, such that the construction of the frames is minimized, whereby the load of the frames is reduced and the volume of the baby wagon in a folded state is minimized, and such that production cost is reduced, whereby price competitiveness is achieved.

Description of the Related Art

A conventional baby wagon is structurally complicated. As a result, a caregiver works a lot when wagon frames are folded or unfolded or when a canopy or a tray is coupled to or detached from the wagon frames. In addition, a change in form of the baby wagon to carry the baby wagon for going out or to store the baby wagon is inconvenient. Furthermore, the weight of the baby wagon is great, whereby it is difficult for the caregiver to handle the baby wagon. Moreover, when the baby wagon is folded, a finger of the caregiver is frequently caught between the frames.

Meanwhile, the conventional baby wagon is configured to have a rectangular internal structure in which the baby is seated on the bottom of the baby wagon. As a result, stability of the baby in the baby wagon is low, and ride comfort of the baby is not maintained when the baby wagon is moved.

Also, overall boarding load of the conventional baby wagon is low, and load is concentrated on lower end and side coupling portions of the wagon frames, whereby the support frames are bent, and therefore durability of the baby wagon is reduced.

PRIOR ART DOCUMENT

Patent Document (Patent Document 0001) Korean Registered Patent Publication No. 10-1672853 (registered on Oct. 31, 2016)

SUMMARY OF THE INVENTION

The present invention has been made in view of the above problems, and it is an object of the present invention to provide a baby wagon with improved ease of use configured such that the load of frames for the baby wagon is dispersed, whereby the baby wagon is supported while stability and durability of the babe wagon are guaranteed, and therefore allowable boarding load is increased, such that the structure of the frames is simplified, whereby the baby wagon is easily carried and stored, such that a baby keeps a comfortable pose depending on physical conditions of the baby, such as age and physical growth of the baby, whereby the ride comfort of the baby is improved while the baby wagon is stably moved, such that the number of unnecessary frames is reduced, whereby the overall weight of the baby wagon is reduced and production cost is reduced, and therefore product competitiveness is achieved, such that a change in shape of the baby wagon through folding and unfolding of the baby wagon is easily performed by a caregiver alone, such that a canopy, a baby seat, and a tray may be conveniently detachably coupled to a foldable main body frame, whereby caregiver's manipulation is easily performed, and such that, when the baby seat is coupled to the foldable main body frame, the baby seat is stably supported, whereby babies and children of various ages can comfortably ride in the baby wagon.

In accordance with the present invention, the above and other objects can be accomplished by the provision of a baby wagon with improved ease of use, the baby wagon including a foldable main body frame, a wagon wheel assembly, a seat , and a canopy , the baby wagon serving as a baby transport means, wherein the foldable main body frame includes a front main frame, which is a frame having a quadrangular structure in which round bars are disposed at the front end of the foldable main body frame in an upright state, the front main frame being configured to support the front of the foldable main body frame, a rear main frame, which is a frame having a quadrangular structure in which round bars are disposed at the rear end of the foldable main body frame in an upright state, the rear main frame being configured to support the rear of the foldable main body frame, and a side frame coupled to left and right ends of the front main frame and the rear main frame in a symmetrical fashion so as to be supported, the side frame being folded through a rotary shaft structure.

I an aspect of the present invention, a baby wagon includes a foldable main body frame including a side frame; a wheel assembly connected to the foldable main body frame; and a seat disposed on the foldable main body frame, wherein the side frame includes a side upper frame, a side lower frame, a connection frame for connecting the side upper frame with the side lower frame, and an auxiliary link frame connected to the connection frame and to the side lower frame and disposed between the side upper frame and the side lower frame.

In an embodiment, the connection frame includes an upper link disposed at an upper end thereof and a lower link disposed at a lower end thereof.

In another embodiment, the side upper frame includes a front side upper frame coupled to a front end of the upper link, and a rear side upper frame coupled to a rear end of the upper link.

In another embodiment, the side lower frame includes a front side lower frame coupled to a front end of the lower link, and a rear side lower frame coupled to a rear end of the lower link.

In another embodiment, the auxiliary link frame includes a front auxiliary link frame, a rear auxiliary link frame, and a middle link for connecting the front and rear auxiliary link frames.

In another embodiment, one end of the front auxiliary link frame is connected to a front end of the middle link, and another end of the front auxiliary link frame is connected to the front side lower frame.

In another embodiment, one end of the rear auxiliary link frame is connected to a rear end of the middle link, and another end of the rear auxiliary link frame is connected to the rear side lower frame.

In another embodiment, the middle link has a through hole, the connection frame penetrates the through hole of the middle link, and the middle link is movable upwards and downward along the connection frame.

In another embodiment, the middle link includes a locking protrusion protruding from a lower end thereof, and the upper link has a folding handle connected to the locking protrusion by a wire, such that, when the folding handle is pulled or released, the locking protrusion is configured to move to lock or unlock the auxiliary link frame.

In another embodiment, the baby wagon further includes a tray having tray fixing clips disposed at left and right outer surfaces thereof, the tray fixing clips extending vertically downwards for detachably coupling the tray to the side upper frame; and a pair of chair seats configured to be respectively disposed at a front and a rear potions of the seat so as to face each other, and including seat fixing clips disposed at left and right outer surfaces thereof, extending vertically downwards and configured to detachably couple the pair of chair seats to the side upper frame.

In another embodiment, the respective chair seat includes a fixing recess disposed in a middle of the respective seat fixing clip, and the side upper frame includes an anti-slip pin protruding from an outside thereof, such that the anti-slip pin is insertable to the fixing recess.

In another embodiment, the bay wagon can include: a strap belt coupled to an end of the respective seat fixing clip and a length adjustment portion disposed on the strap belt for adjusting a height of the respective chair seat and for primarily coupling the respective chair seat to the side upper frame; and a fixing belt including a male and a female buckles and a length adjustment portion formed at a rear of the respective chair seat for adjusting a backrest angle of the respective chair seat and for secondarily coupling the respective chair seat to the foldable main body frame.

In another embodiment, the baby wagon further includes a baby carrier canopy detachably coupled to an upper end of the foldable main body frame, wherein the baby carrier canopy is configured to be unfolded so as to have a fan-shaped side surface or to be folded, and is coupled to the foldable main body frame.

In another embodiment, the baby carrier canopy includes: a canopy support frame including a sliding recess disposed at a lower end thereof and configured to detachably couple the canopy support frame to the foldable main body frame; and a canopy rotary shaft frame configured to be unfolded in a fan shape or folded based on a rotary shaft coupled to the lower end of the canopy support frame.

In another embodiment, the baby wagon further includes a front main frame connected to the side frame and including an upper shaft fixing member disposed at an upper portion thereof, one end of the upper shaft fixing member being coupled to the side frame via a rotary shaft, wherein the upper shaft fixing member includes a pole insertion hole disposed at an upper end thereof and formed vertically downwards and into which a round-bar-shaped canopy fixing pole is inserted, and further includes a pole fixing switch disposed on a side of the pole insertion hole, and the pole fixing switch is configured to move in a sliding fashion in order to fix the canopy fixing pole after the canopy fixing pole is inserted into the pole insertion hole in a vertical direction.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, preferred embodiments of the present invention will be described with reference to the accompanying drawings.

Figure 1:
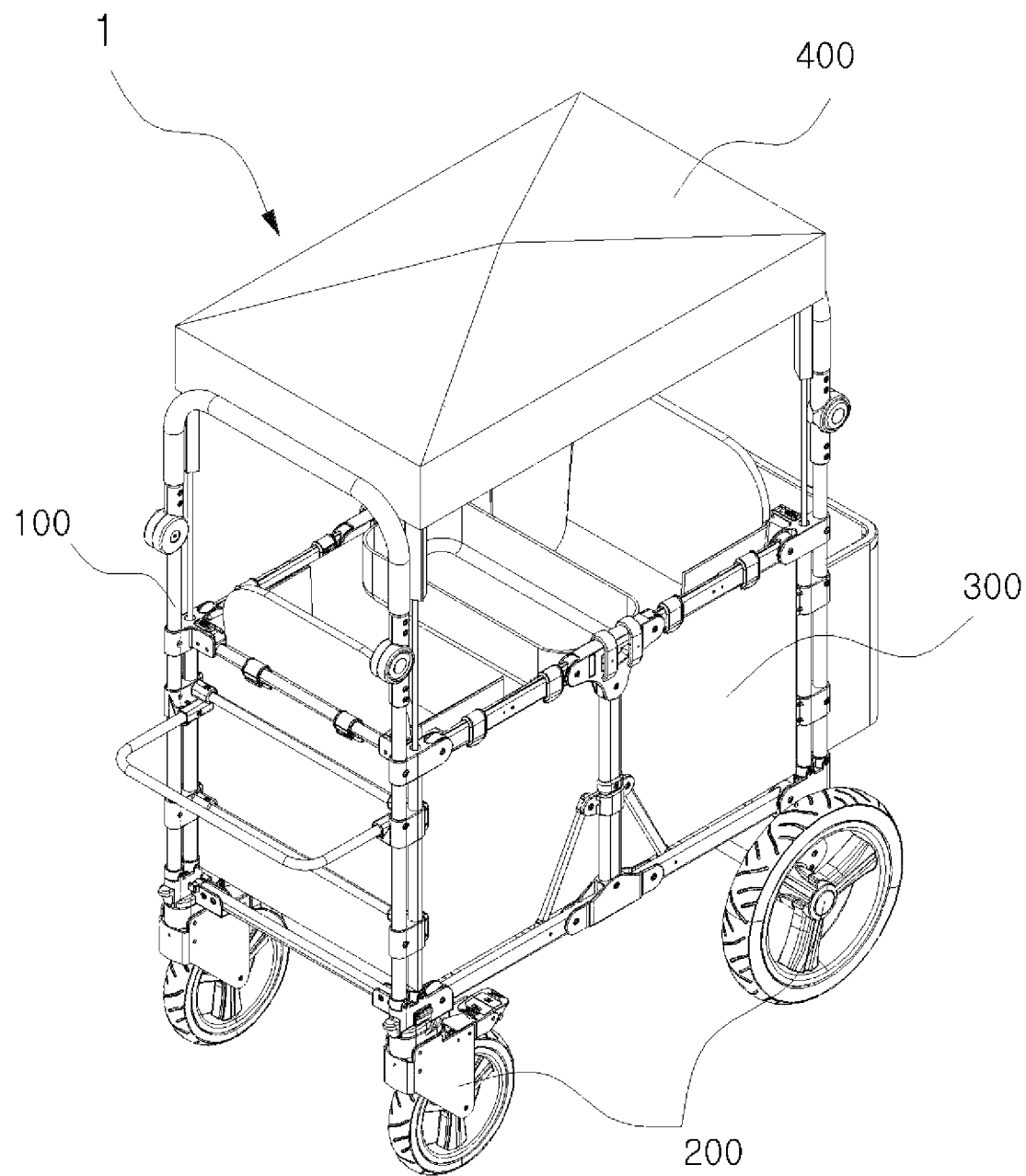
FIG. 1 is a perspective view showing the overall shape of a baby wagon with improved ease of use according to the present invention.
Figure 2:
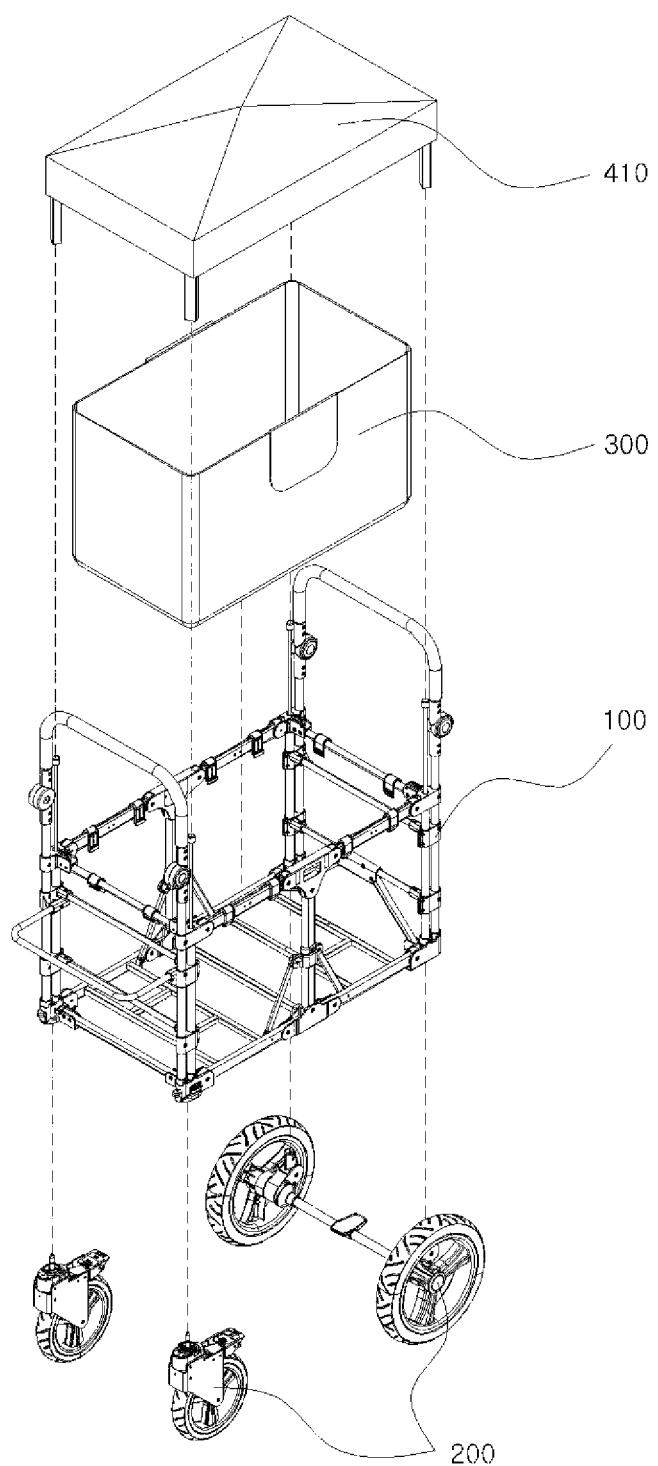
FIG. 2 is an exploded perspective view showing components of the baby wagon with improved ease of use according to the present invention to which a wagon canopy is selectively coupled.
Figure 3:
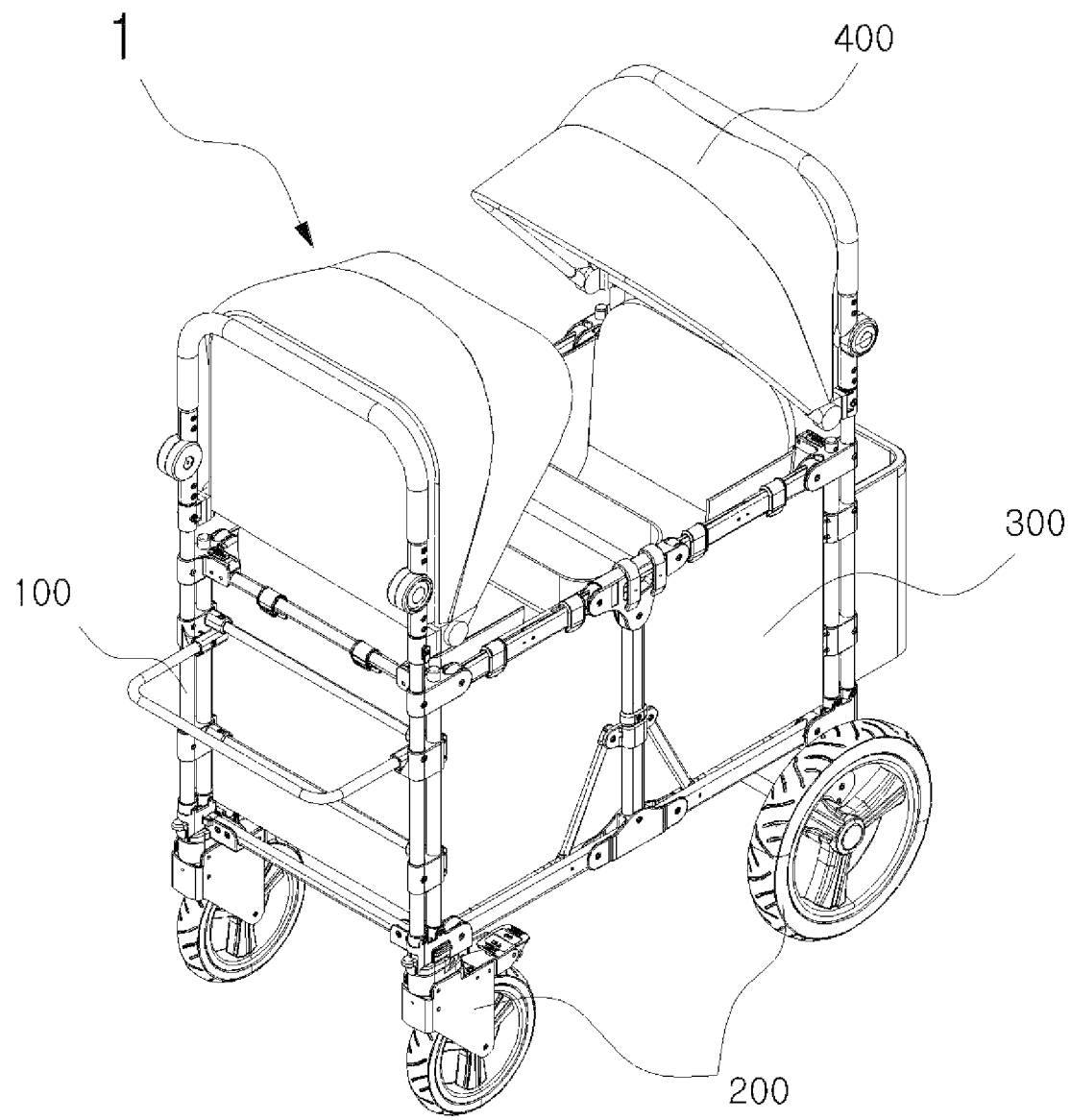
FIG. 3 is a perspective view showing the overall shape of the baby wagon with improved ease of use according to the present invention.
Figure 4:
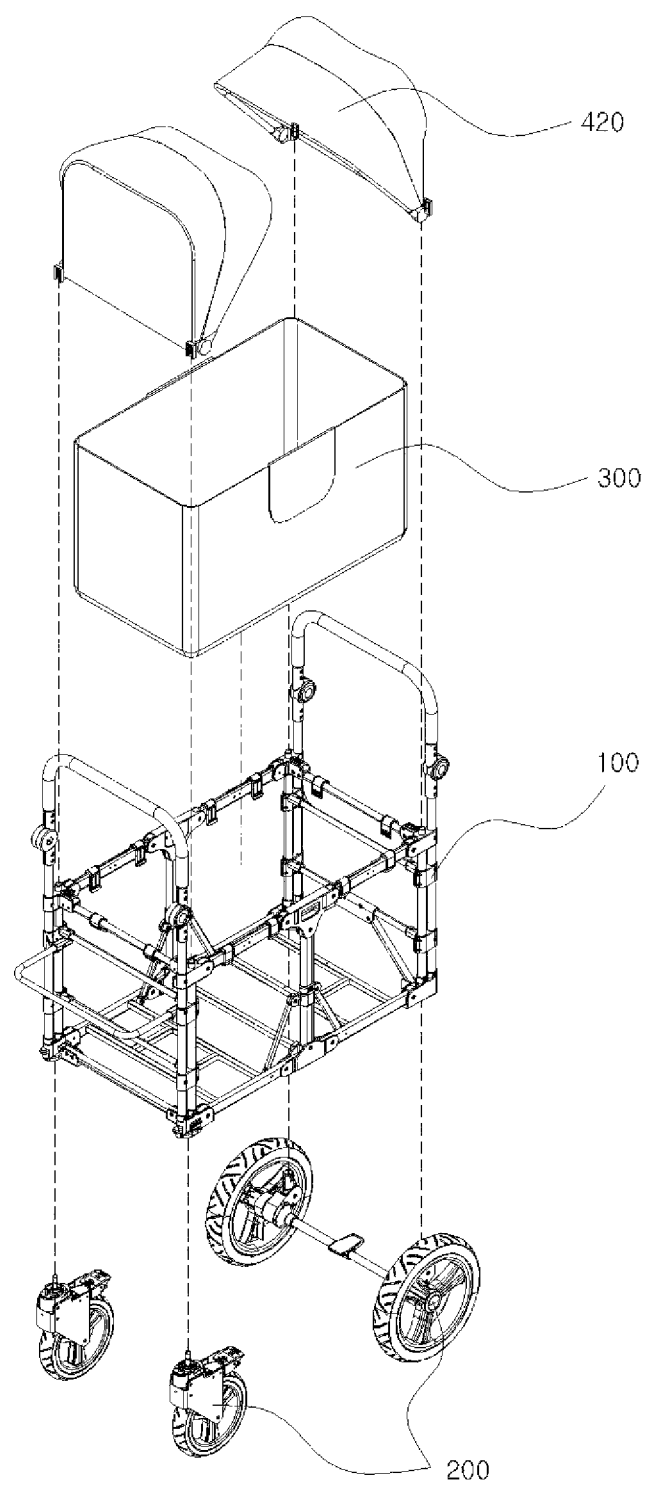
FIG. 4 is an exploded perspective view showing components of the baby wagon with improved ease of use according to the present invention to which a baby carrier canopy is selectively coupled.
Figure 5:
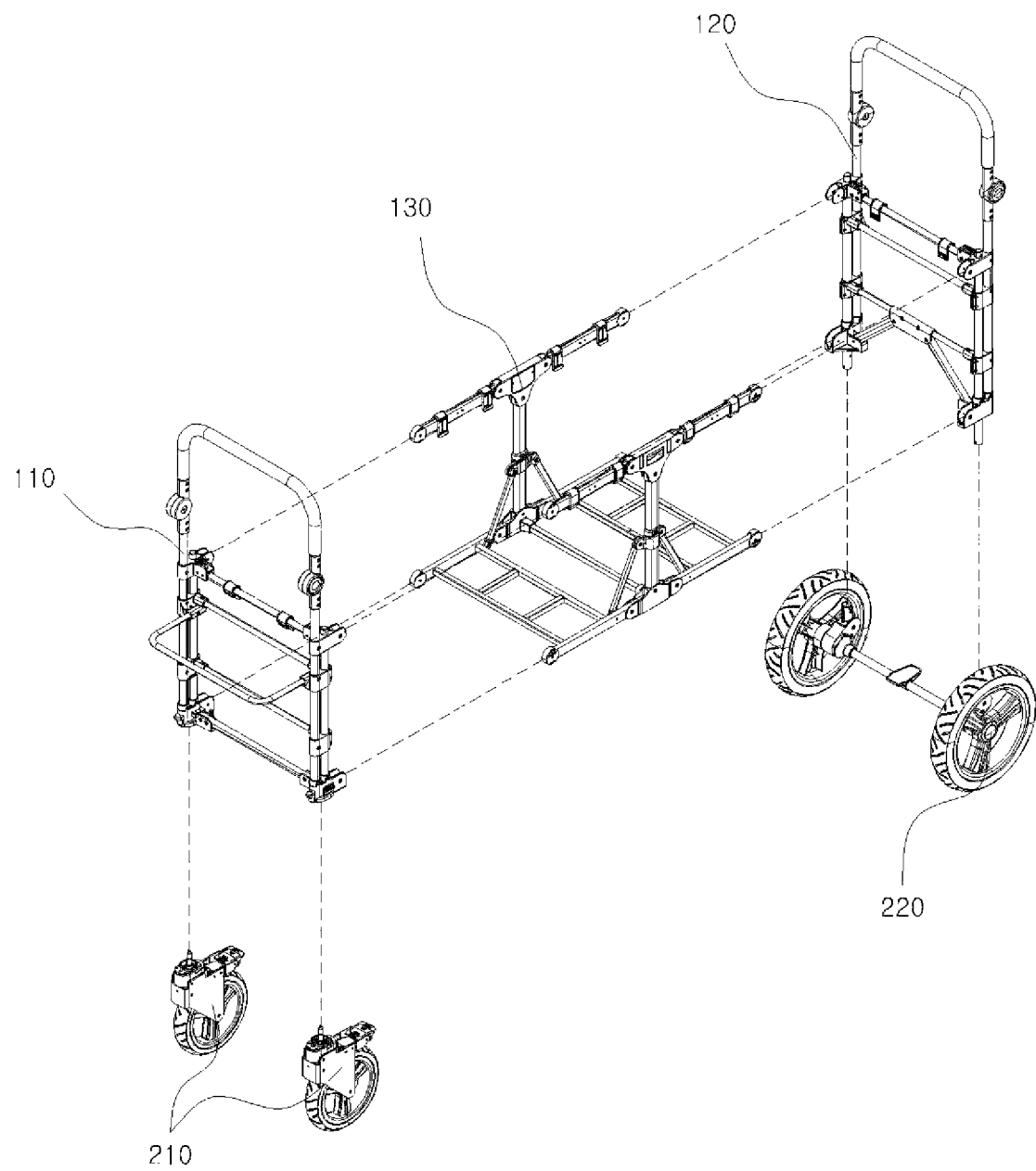
FIG. 5 is an exploded perspective view showing components of a foldable main body frame and a wagon wheel assembly according to the present invention.
Figure 6:
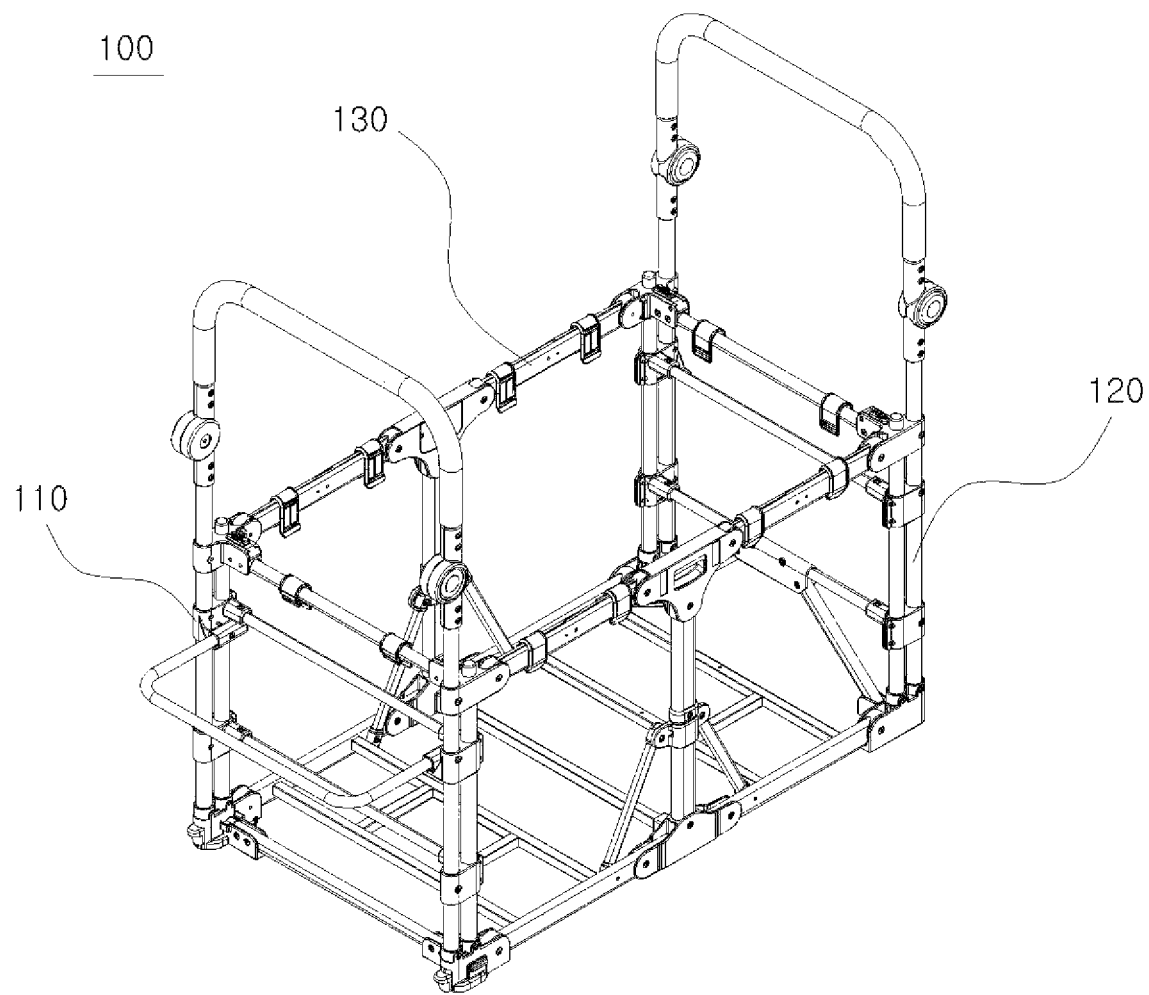
FIG. 6 is a perspective view showing the overall shape of the foldable main body frame according to the present invention.
Figure 7:
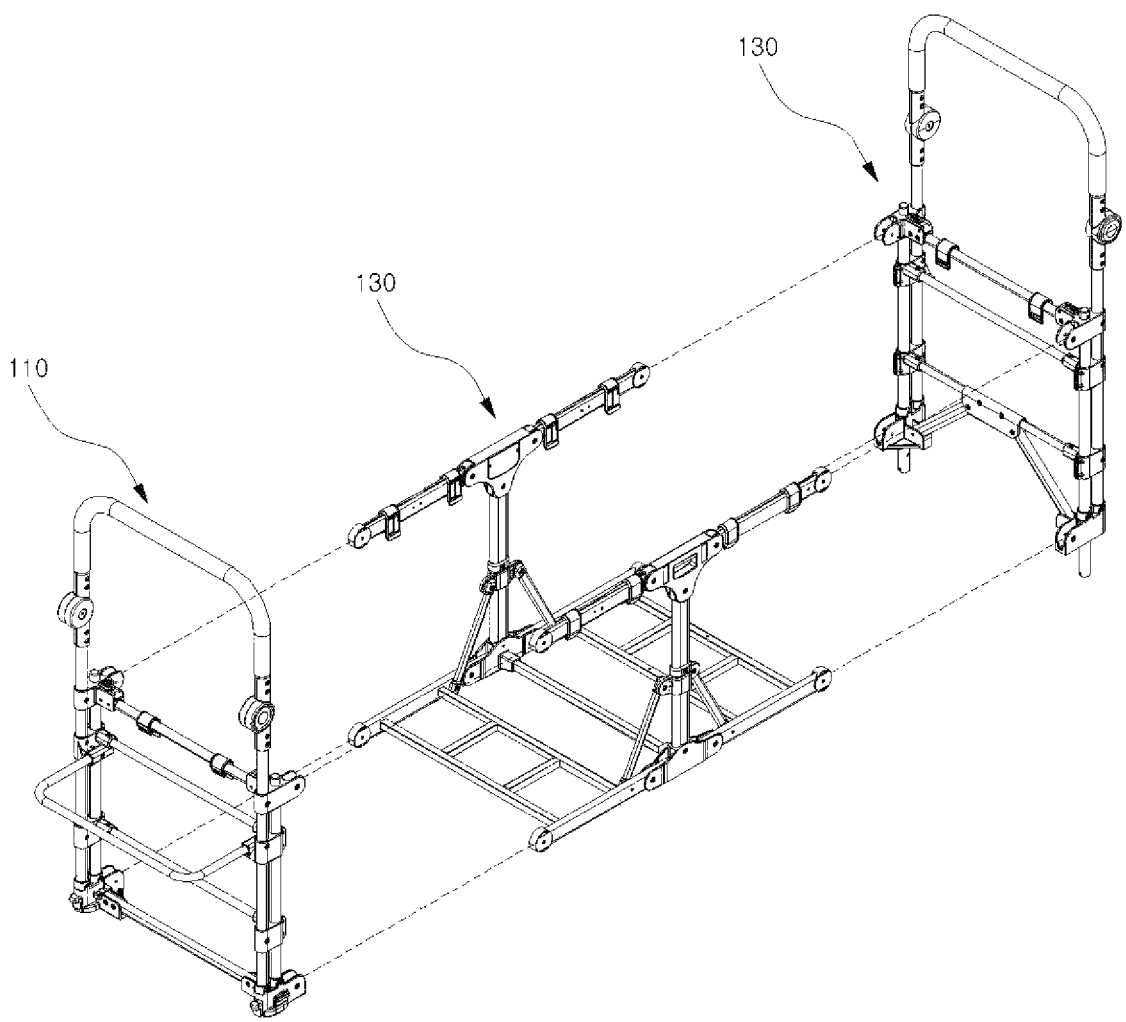
FIG. 7 is an exploded perspective view showing components of the foldable main body frame according to the present invention.
Figure 8:
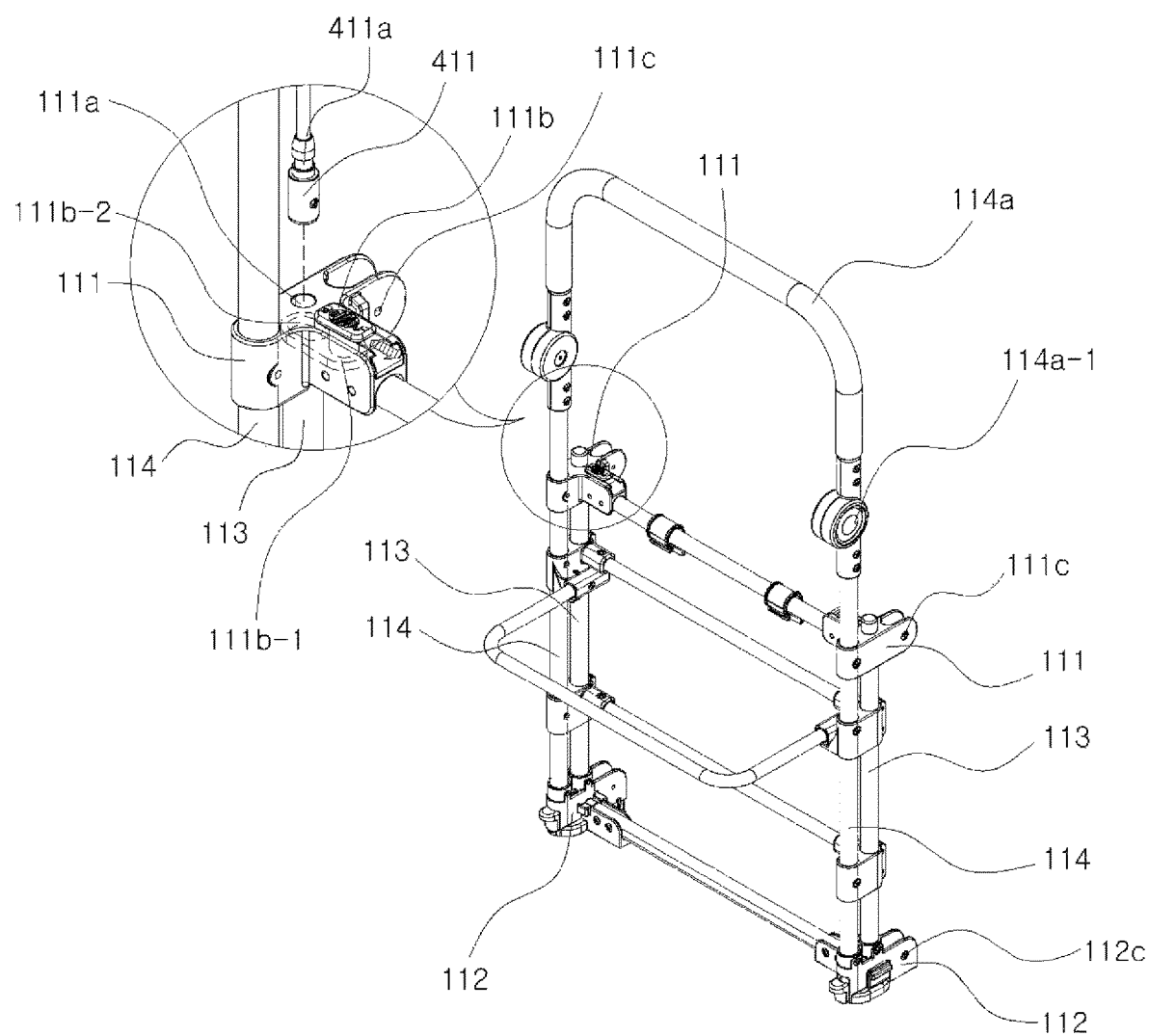
FIG. 8 is a view showing the overall shape of a front main frame according to the present invention with a partial enlarged view showing a portion of the front main frame.
Figure 9:
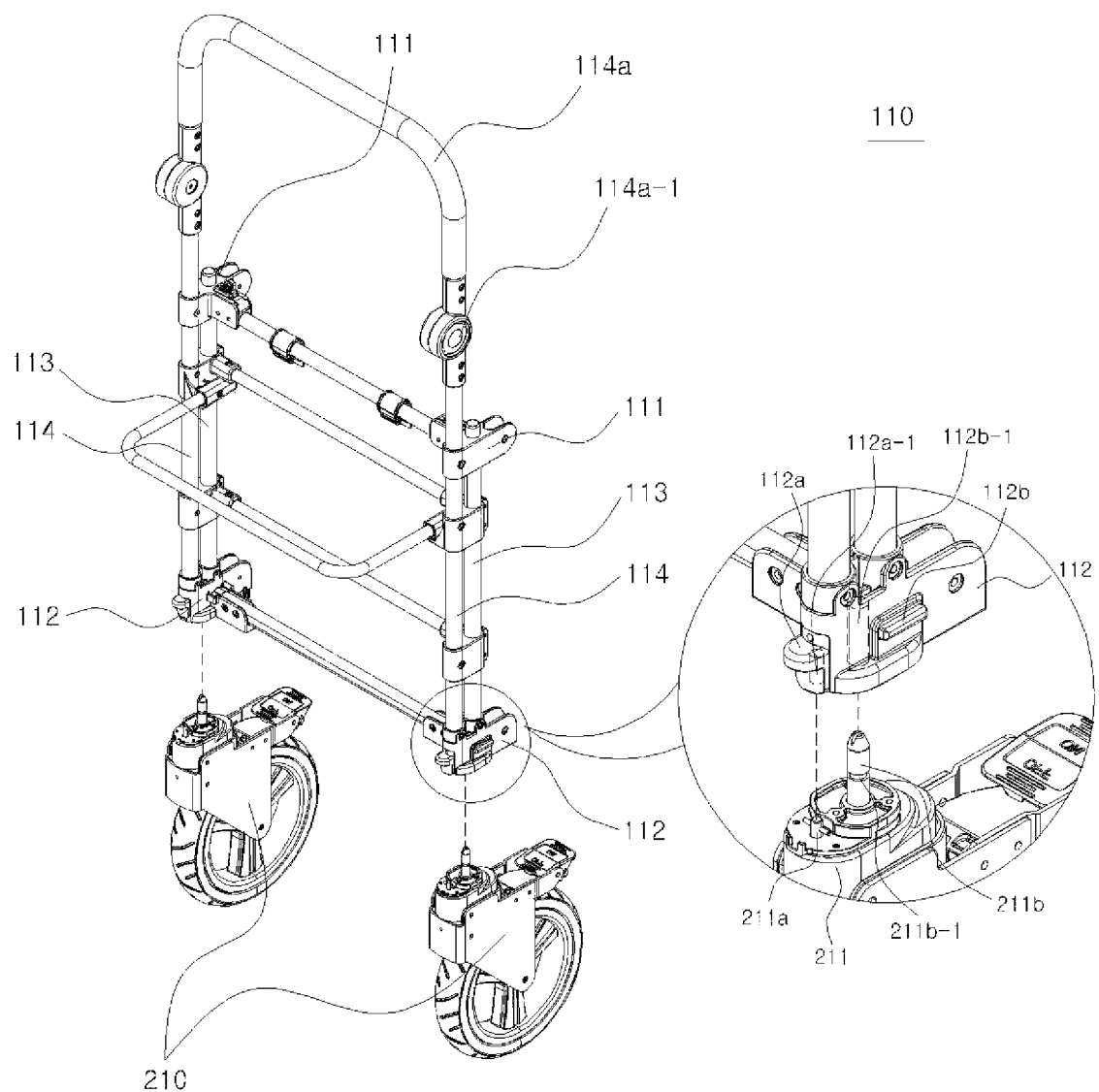
FIG. 9 is an exploded view showing a front wheel coupled to the lower end of the front main frame according to the present invention with a partial enlarged view showing the coupled portions therebetween.
Figure 10:
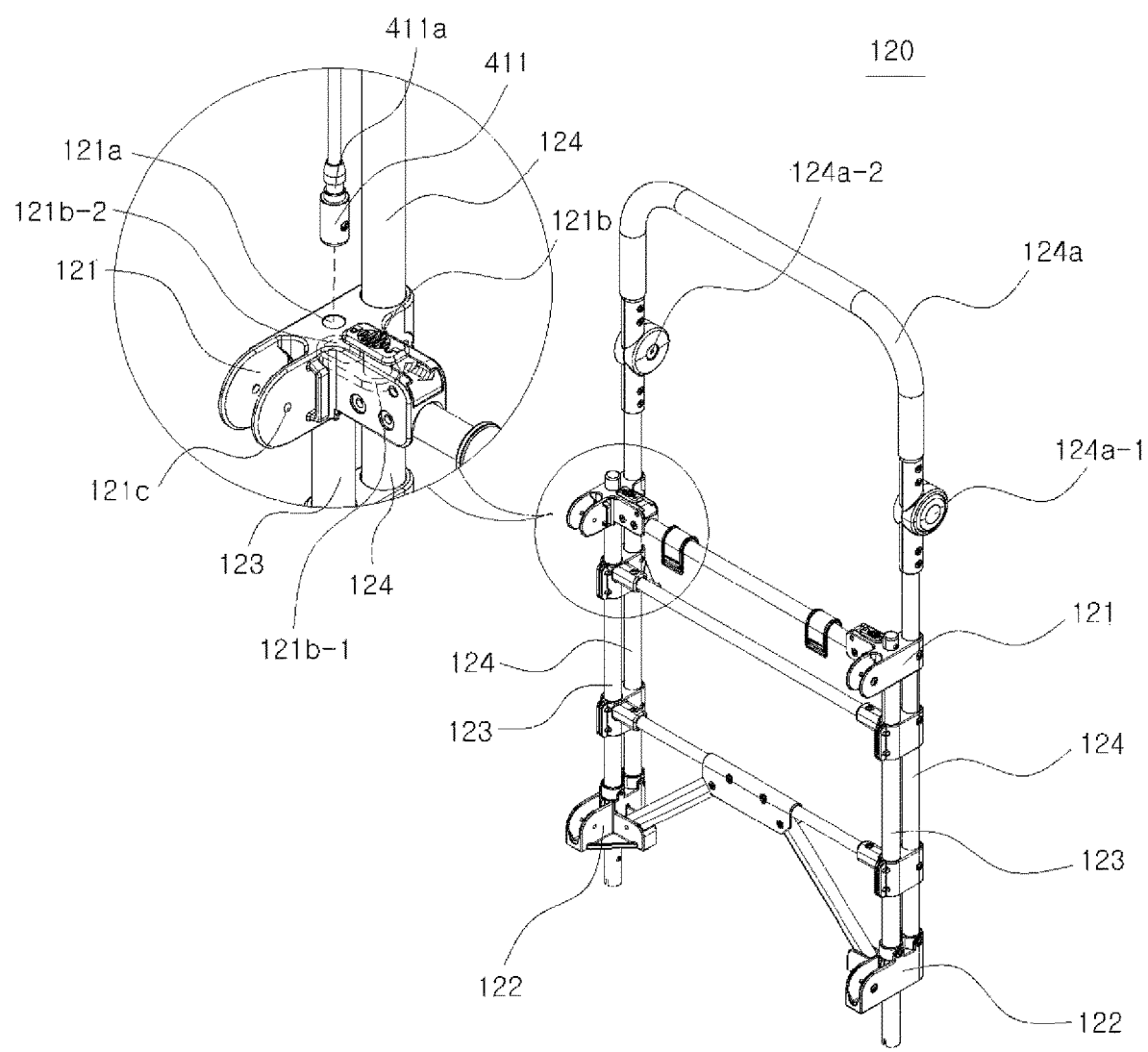
FIG. 10 is a view showing the overall shape of a rear main frame according to the present invention with a partial enlarged view showing a portion of the rear main frame.
Figure 11:
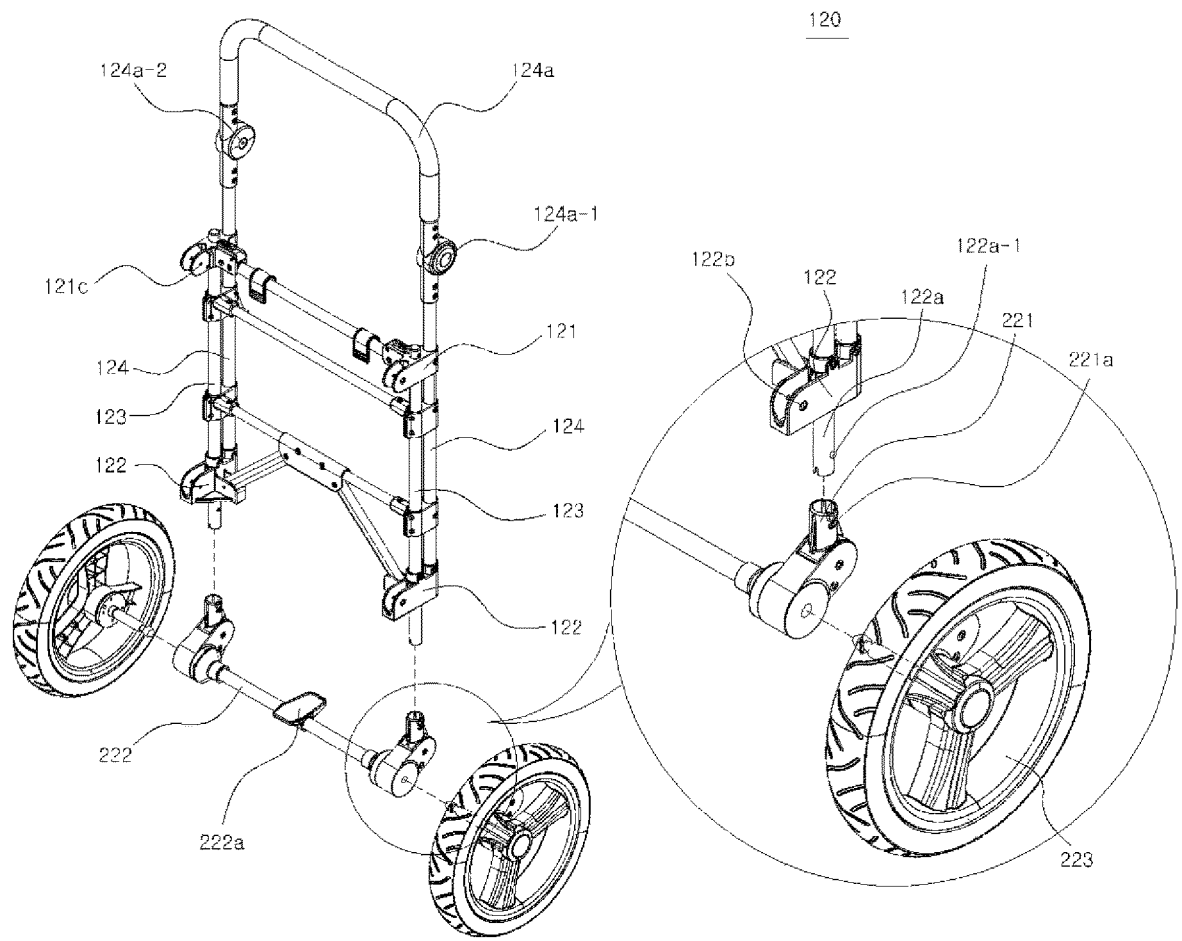
FIG. 11 is an exploded view showing a rear wheel coupled to the lower end of the rear main frame according to the present invention with a partial enlarged view showing the coupled portions therebetween.
Figure 12:
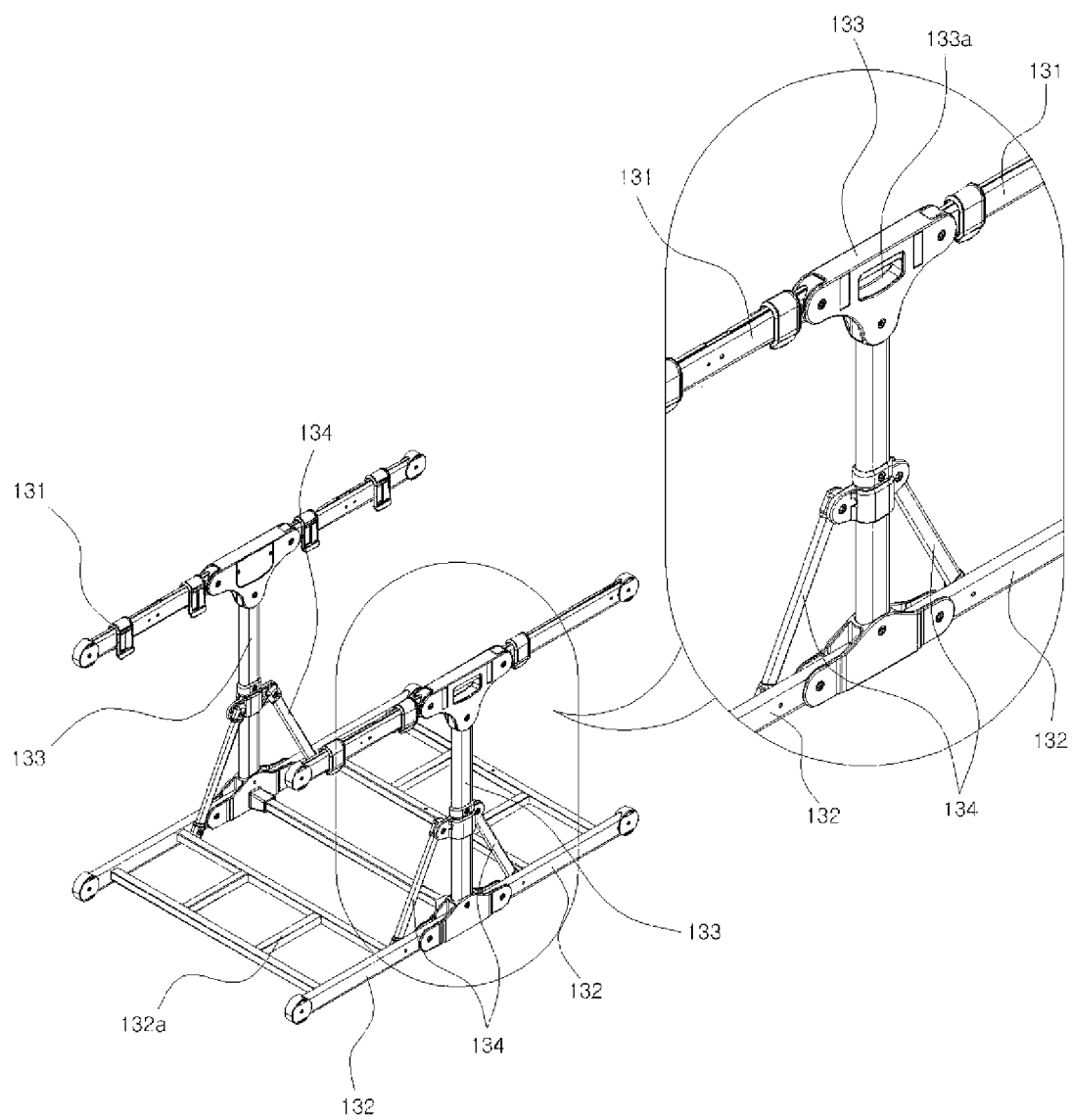
FIG. 12 is a view showing the overall shape of a side frame according to the present invention with a partial enlarged view showing a portion of the side frame.
Figure 13:
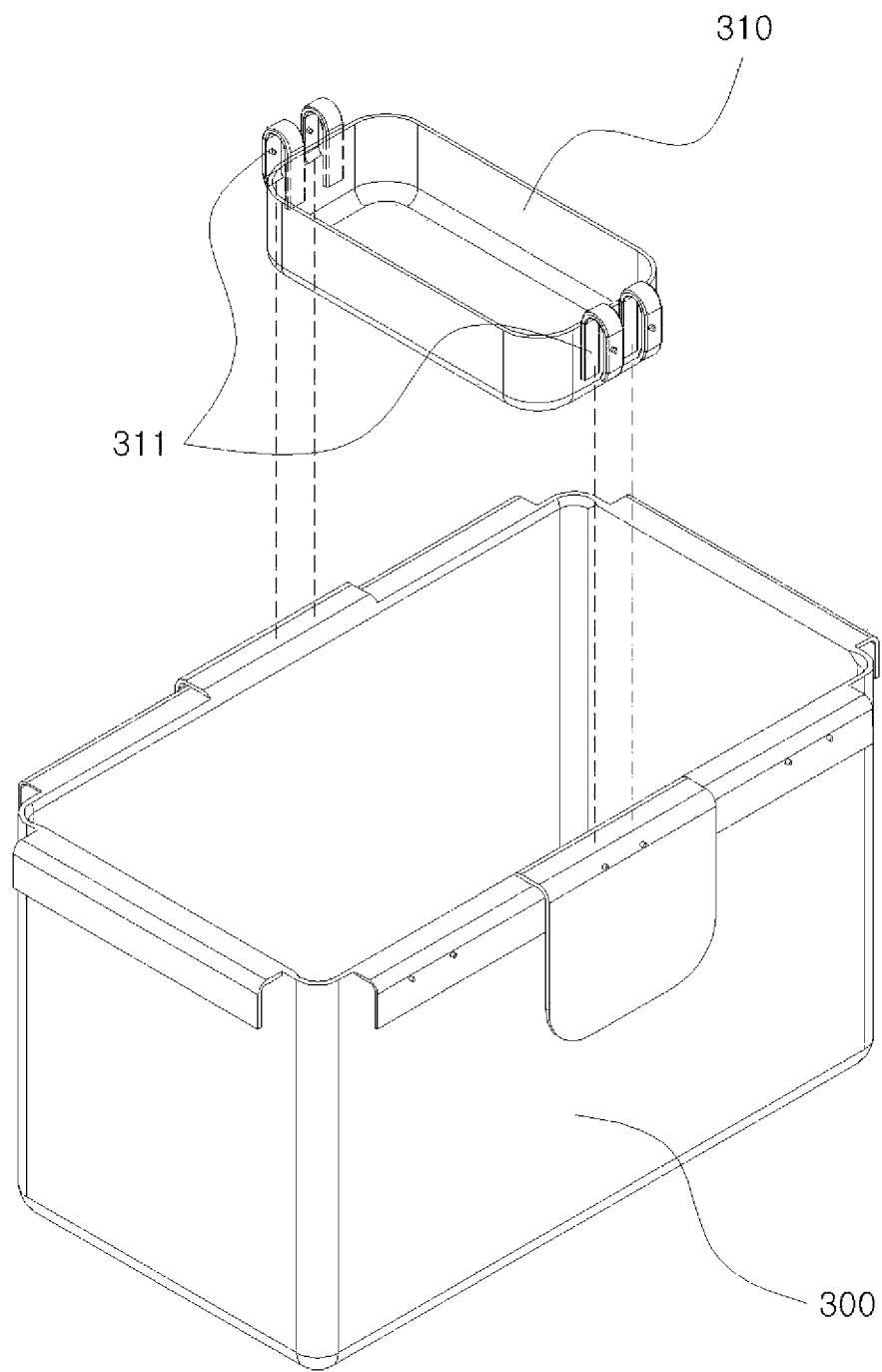
FIG. 13 is an exploded perspective view showing coupling of a tray to a seat according to the present invention.
Figure 14:
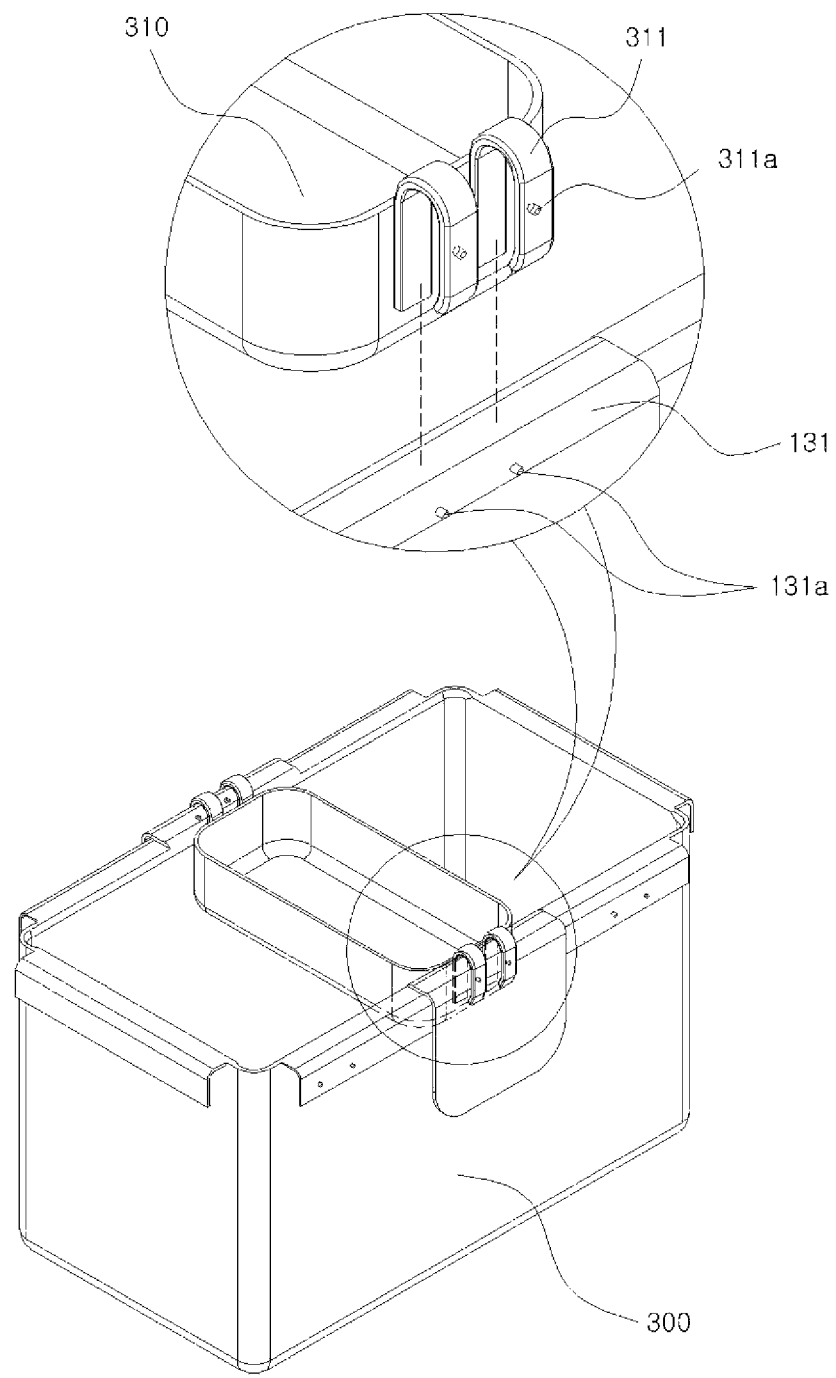
FIG. 14 is a view showing the tray coupled to the seat according to the present invention with a partial enlarged view showing the coupled portions therebetween.
Figure 15:
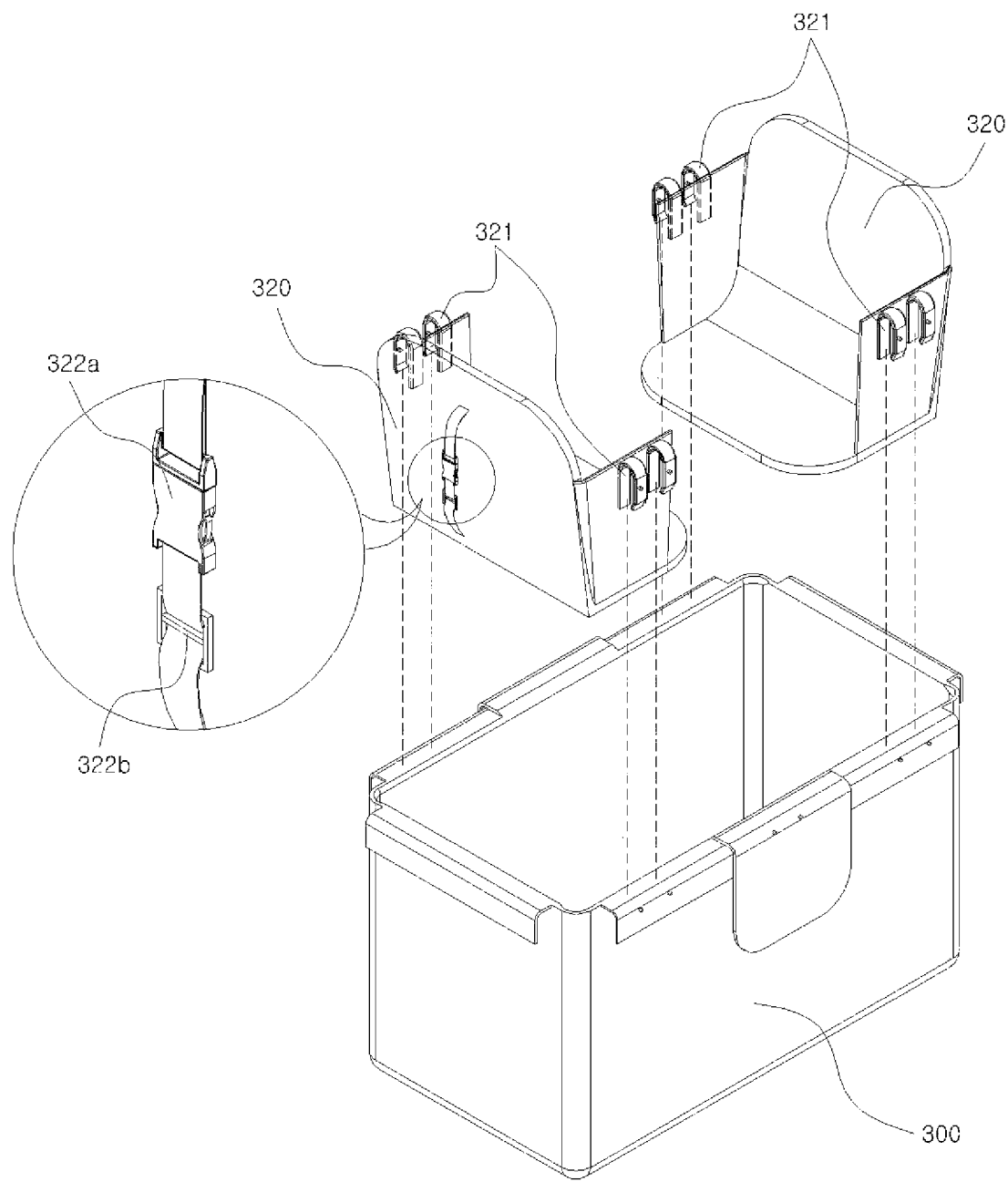
FIG. 15 is an exploded perspective view showing coupling of a chair seat to the seat according to the present invention with a partial enlarged view showing a portion of the chair seat.
Figure 16:
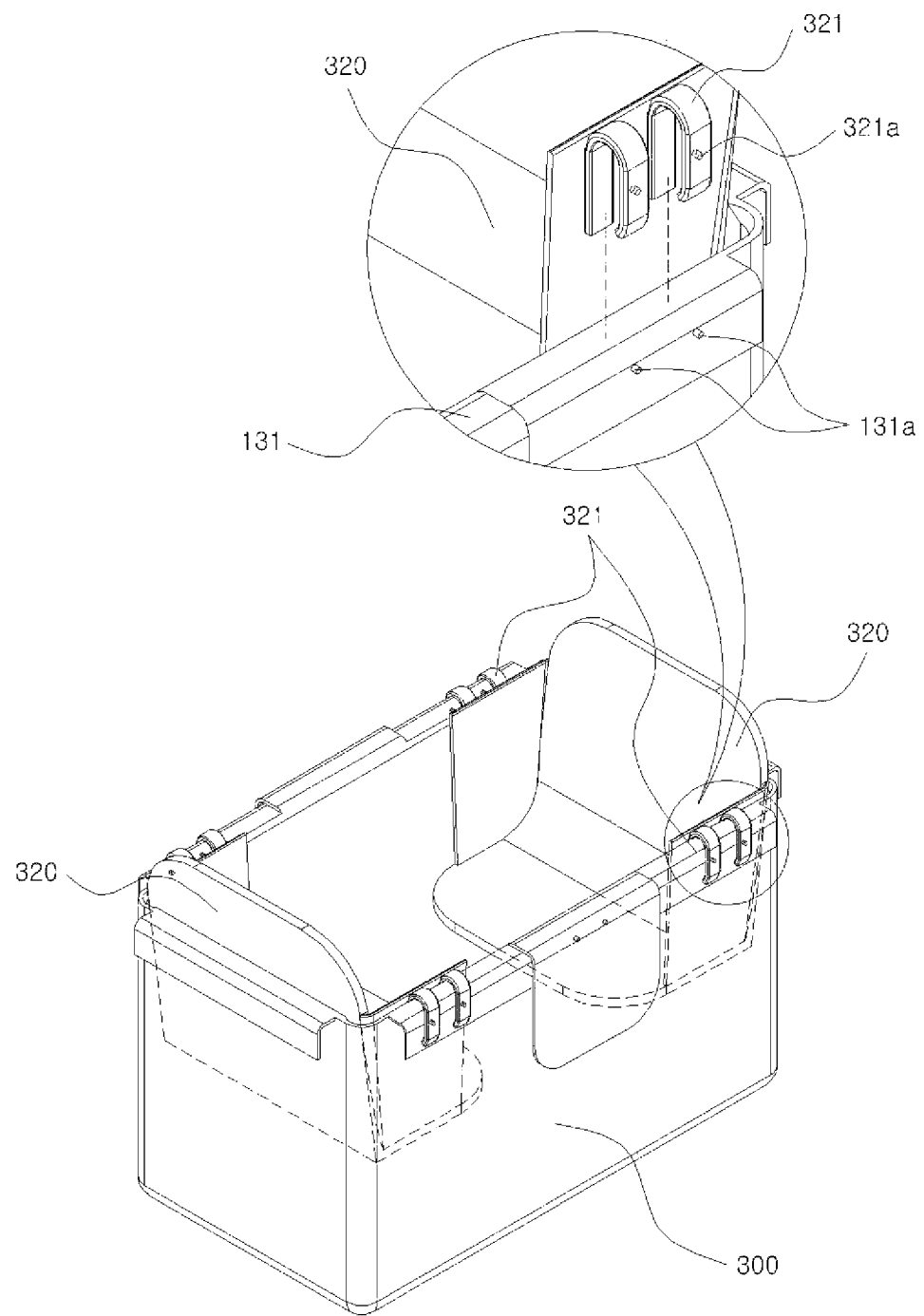
FIG. 16 is a view showing the chair seat coupled to the seat according to the present invention with a partial enlarged view showing the coupled portions therebetween.
Figure 17:
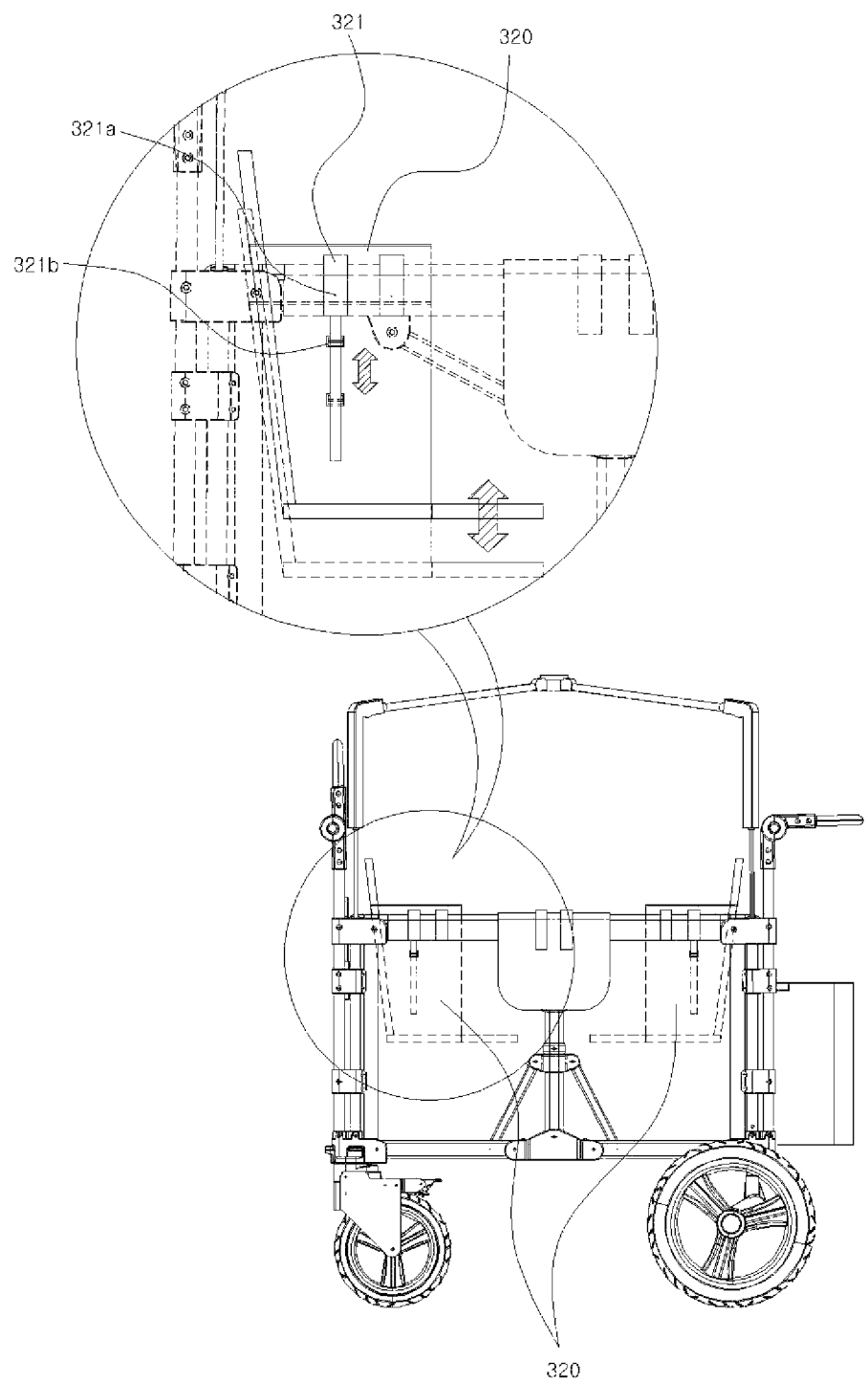
FIG. 17 is an enlarged view showing an embodiment in which the height of the chair seat according to the present invention is adjusted through a length adjustment portion connected to a fixing clip of the chair seat.
Figure 18:
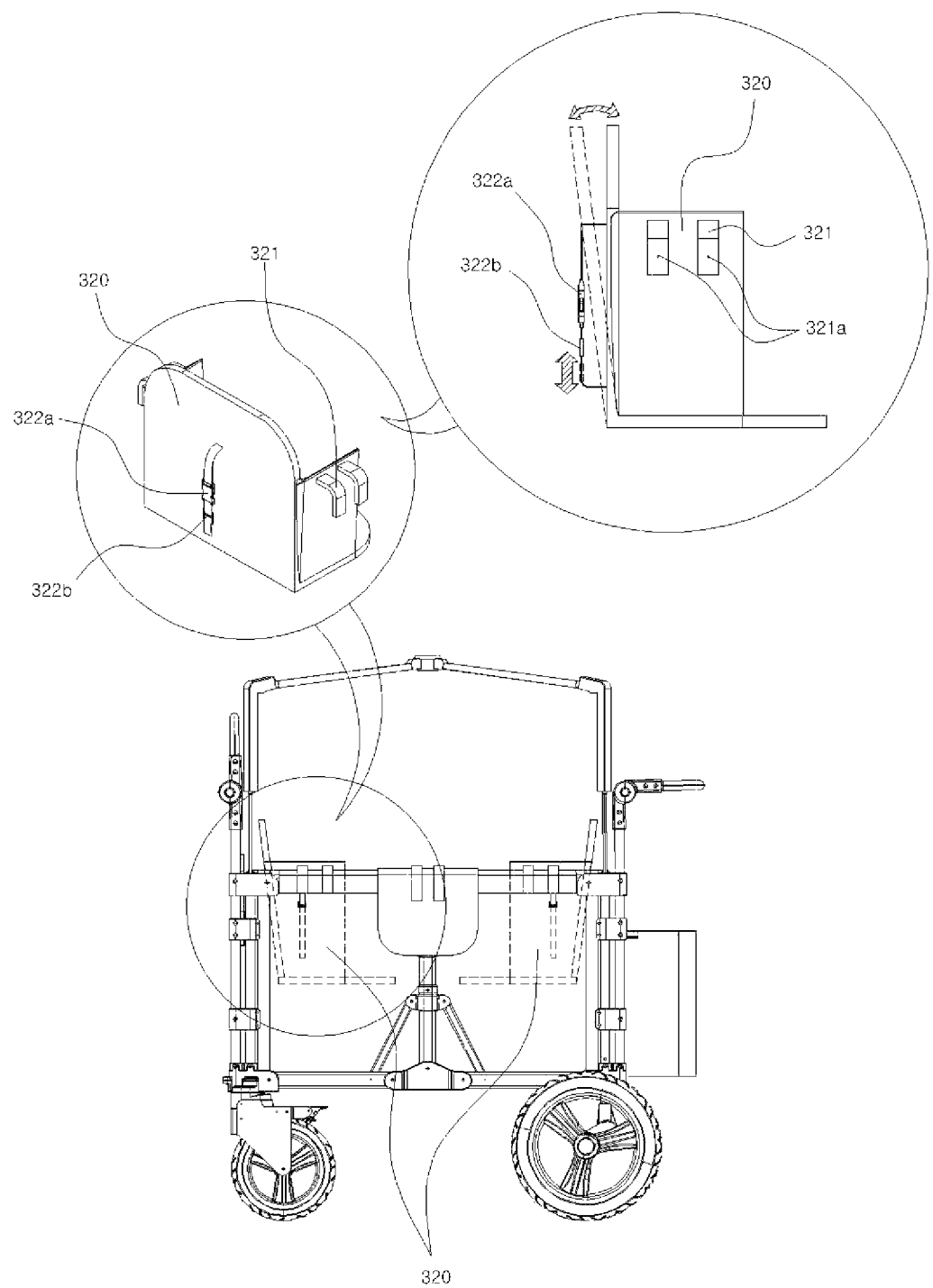
FIG. 18 is an enlarged view showing an embodiment in which the backrest angle of the chair seat according to the present invention is adjusted through a length adjustment portion connected to a fixing belt of the chair seat.

FIG. 1 is a perspective view showing the overall shape of a baby wagon with improved ease of use according to the present invention. The baby wagon includes a foldable main body frame 100, a wagon wheel assembly 200, a seat 300, and a canopy 400. The foldable main body frame 100 includes a front main frame 110, a rear main frame 120, and a side frame 130.

Hereinafter, the foldable main body frame 100 according to the present invention will be described.

The foldable main body frame 100, which is a cuboidal frame, is formed so as to generally support the main body of the baby wagon 1, and is configured such that a middle part of the foldable main body frame 100 is folded or unfolded in a forward-rearward direction, whereby the shape of the foldable main body frame 100 is changed.

The foldable main body frame 100 according to the present invention includes a front main frame 110, a rear main frame 120, and a side frame 130.

First, the front main frame 110 according to the present invention will be described.

The front main frame 110, which is a frame having a quadrangular structure in which round bars are disposed at the front end of the foldable main body frame 100 in an upright state, supports the front of the foldable main body frame 100.

The front main frame includes an upper shaft fixing member 111, a lower shaft fixing member 112, a main support frame 113, and a front handle frame 114.

The upper shaft fixing member 111 is formed at each of upper left and right ends of the front main frame in a symmetrical fashion. One side of the rear of the upper shaft fixing member 111 is coupled to an upper front end of the side frame via a rotary shaft 111c so as to be supported. A pole insertion hole 111a is formed vertically downwards in one side of the upper end of the upper shaft fixing member 111 to support a round-bar-shaped canopy fixing pole 411 in the state in which the canopy fixing pole 411 is inserted into the pole insertion hole 111a.

The upper shaft fixing member 111 according to the present invention is provided in one side of the upper end thereof with a pole insertion hole 111a, which is formed vertically downwards and into which the round-bar-shaped canopy fixing pole 411 can be inserted. A pole fixing switch 111b is formed at one side of the pole insertion hole 111a. The pole fixing switch 111b is configured to move in a sliding fashion in order to fix the canopy fixing pole 411 after the canopy fixing pole 411 is inserted into the pole insertion hole 111a in a vertical direction.

The pole fixing switch 111b is provided with a pole locking frame 111b-1 having an oval hole 111b-2 formed therein. The pole locking frame 111b-1 is inserted into the upper shaft fixing member 111, the canopy fixing pole 411 is inserted into the oval hole 111b-2 of the pole locking frame 111b-1, and one side of the pole locking frame 111b-1 is inserted into and supported by a pole fixing recess 411a formed in each of the upper end and the lower end of the canopy fixing pole 411.

After being vertically inserted into the upper shaft fixing member 111 and the main support frame 113, the canopy fixing pole 411 can be withdrawn to a certain extend in an upward direction, and the pole fixing switch 111b is slid such that one side of the pole fixing switch 111b is inserted into the pole fixing recess 411a formed in the lower end of the canopy fixing pole 411 in order to fix the canopy fixing pole 411, whereby a canopy coupling mode in which the canopy 400 is coupled to the canopy fixing pole is formed. The canopy fixing pole 411 can be pulled in a downward direction, and the pole fixing switch 111b is slid such that one side of the pole fixing switch is inserted into the pole fixing recess 411a formed in the upper end of the canopy fixing pole in order to fix the canopy fixing pole, whereby a canopy removal mode in which the canopy 400 is detached from the canopy fixing pole is formed.

Further, the upper shaft fixing member 111 includes a hole through which the front handle frame 114 penetrates.

As described above, it is possible to easily change the fixing position of the canopy fixing pole 411 through sliding of the pole fixing switch 111b, whereby it is possible to easily detachably couple the canopy 400 to the canopy fixing pole 111a.

The lower shaft fixing member 112 is formed at each of left and right lower ends of the front main frame 110 in a symmetrical fashion. One side of the rear of the lower shaft fixing member 112 is coupled to a lower front end of the side frame via a rotary shaft 112c so as to be supported. A front wheel is coupled vertically upwards to one side of the lower end of the lower shaft fixing member 112, whereby the front wheel is supported.

The lower shaft fixing member 112 includes a front wheel rotation fixing switch 112a and a front wheel detachment switch 112b.

The front wheel rotation fixing switch 112a, which is a switch located at the front of the lower shaft fixing member 112 so as to be moved in an upward-downward direction, serves to fix or separate a rotation fixing pin 211a inserted into a rotation fixing pin insertion recess 112a-1 formed in a front side of the lower end of the lower shaft fixing member 112 as the result of being adjusted in the upward-downward direction, thereby controlling 360-degree rotation of the front wheel 210 in a horizontal direction.

When the front wheel rotation fixing switch 112a is moved in the upward direction, the rotation fixing pin 211a inserted into the rotation fixing pin insertion recess 112a-1 of the lower end of the lower shaft fixing member 112 is detached, whereby a direction changing mode in which a front wheel frame 211 is rotatable 360 degrees about a front wheel coupling pin 21b in the horizontal direction is set. When the front wheel rotation fixing switch 112a is moved in the downward direction, the rotation fixing pin 211a is coupled to the front side of the lower end of the lower shaft fixing member 112, whereby a straight movement mode in which horizontal rotation of the front wheel frame 211 is interrupted such that the front wheel frame is fixed is set.

One of the direction changing mode and the straight movement mode is performed by selection of a caregiver.

In the direction changing mode, a front wheel is not fixed in a specific direction but is rotatable 360 degrees in a horizontal direction, whereby smooth direction change of the baby wagon is guided, and necessary force is reduced at the time of direction change, whereby caregiver fatigue is reduced.

In the straight movement mode, the front wheel is fixed so as to face the front such that the front wheel can be moved in a straight direction without rotation thereof in the horizontal direction, whereby the baby wagon is uniformly moved through pushing force without strong manipulation of a handle when the baby wagon is moved in the straight direction without direction change, and therefore caregiver fatigue is reduced.

The front wheel detachment switch 112b, which is a switch located at an outer side of the lower shaft fixing member 112 so as to be moved in the upward-downward direction, and a front wheel detachment bar protruding in an inward direction of a coupling pin recess 112b-1 formed in a rear side of the lower end of the lower shaft fixing member 112 is coupled to or separated from a coupling pin recess 211b-1 of a front wheel coupling pin 211b as the result of being adjusted in the upward-downward direction, whereby the front wheel 210 is detachably coupled.

When the front wheel detachment switch 112b is moved in the upward direction, the front wheel detachment bar protruding in the inward direction is moved and separated from the coupling pin recess 211b-1, whereby the front wheel 210 is detached. When the front wheel detachment switch 112b is moved in the downward direction, the front wheel detachment bar protruding in the inward direction is moved and coupled to the coupling pin recess 211b-1, whereby the front wheel 210 is coupled to the lower end of the front frame.

Since the front wheel 210 is easily detached, as described above, the baby wagon may be easily carried and stored when the baby wagon is not used, and partial replacement is possible when the front wheel is worn or damaged, whereby maintenance of the baby wagon is easily performed.

The main support frame 113, which is a frame coupled to the upper shaft fixing member 111 and the lower shaft fixing member 112, which are formed in left-right symmetry, so as to have a quadrangular shape, serves to generally support the front main frame.

The front handle frame 114 is coupled to the left front and the right front of the main support frame in an upright state, and a handle structure is formed at the upper end of the front handle frame.

A rotary shaft is formed at each of the left and right upper ends of the front handle frame 114 in a symmetrical fashion, and a rotation control button 114a-1 is formed at the outside of the rotary shaft to adjust and fix the stepwise angle of a front angle adjustment handle 114a, which interconnects the left and right upper ends of the front handle frame.

The stepwise angle of the front angle adjustment handle 114a is adjusted by button adjustment type rotation of the rotation control button, and the angle of the front angle adjustment handle may be set by selection of the caregiver in the state in which each of the left and right rotation control buttons is pushed.

At this time, the front angle adjustment handle 114a is rotatable through ten steps from an angle of 0 degrees, at which the front angle adjustment handle is folded in a state of being parallel to the main support frame, to an angle of 180 degrees, at which the front angle adjustment handle is upright in the opposite direction.

The front angle adjustment handle may be rotated stepwise to predetermined angles, and the angle of the front angle adjustment handle may be changed depending on the height of the caregiver, and the position of the arms of the caregiver, an uphill road, a downhill road, movement of the baby wagon by pulling of the front angle adjustment handle in front of the front angle adjustment handle, or movement of the baby wagon by pushing of the front angle adjustment handle, whereby force applied to the arms of the caregiver may be minimized. In a folding mode, the front angle adjustment handle may be disposed parallel to the main support frame, whereby the volume of the baby wagon may be minimized.

Also, in the case in which the angle of the front angle adjustment handle is set to an angle of 90 degrees, which becomes a right angle in an outward direction, when the baby wagon is moved by pushing the front angle adjustment handle, the distance between the feet of the caregiver and the baby wagon is maximized, whereby it is possible to prevent a kickback phenomenon in which the foot of the caregiver, which steps forwards when the caregiver walks, collides with the baby wagon, thereby enabling the caregiver to walk comfortably and improving the ride comfort of a baby.

Second, the rear main frame 120 according to the present invention will be described.

The rear main frame 120, which is a frame having a quadrangular structure in which round bars are disposed at the rear end of the foldable main body frame 100 in an upright state, supports the rear of the foldable main body frame 100.

The rear main frame 120 includes an upper shaft fixing member 121, a lower shaft fixing member 122, a main support frame 123, and a rear handle frame 124.

The upper shaft fixing member 121 is formed at each of upper left and right ends of the rear main frame in a symmetrical fashion. The front of the upper shaft fixing member 121 is coupled to an upper rear end of the side frame via a rotary shaft 121c so as to be supported. A pole insertion hole is formed vertically downwards in one side of the upper end of the upper shaft fixing member 121 to support a round-bar-shaped canopy fixing pole 411 in the state in which the canopy fixing pole is inserted into the pole insertion hole.

The upper shaft fixing member 121 according to the present invention is provided with a pole fixing switch 121b, which is located at one side of the upper end of a pole insertion hole 121a formed in the upper shaft fixing member 121 so as to be movable in a sliding fashion. A pole penetration support frame is formed inside the pole fixing switch in order to fix the canopy fixing pole 411 after the canopy fixing pole 411 is inserted into the pole insertion hole as the result of sliding of the pole fixing switch.

The pole fixing switch 121*b* is provided with a pole locking frame 121*b*-1 having an oval hole 121*b*-2 formed therein. The pole locking frame 121*b*-1 is inserted into the upper shaft fixing member 121, the canopy fixing pole 411 is inserted into the oval hole 121*b*-2 of the pole locking frame 121*b*-1, and one side of the pole locking frame 121*b*-1 is inserted and supported into a pole fixing recess 411*a* formed in each of the upper end and the lower end of the canopy fixing pole 411.

After being vertically inserted into the upper shaft fixing member 121 and the main support frame 123, the canopy fixing pole 411 is withdrawn in the upward direction, and the pole fixing switch is slid such that one side of the pole fixing switch is inserted into the pole fixing recess 411*a* formed in the lower end of the canopy fixing pole in order to fix the canopy fixing pole, whereby a canopy coupling mode in which the canopy 400 is coupled to the canopy fixing pole is formed. The canopy fixing pole 411 is pulled in the downward direction, and the pole fixing switch is slid such that one side of the pole fixing switch is inserted into the pole fixing recess 411*a* formed in the upper end of the canopy fixing pole in order to fix the canopy fixing pole, whereby a canopy removal mode in which the canopy 400 is detached from the canopy fixing pole is formed.

As described above, it is possible to easily change the fixing position of the canopy fixing pole through sliding of the pole fixing switch 121*b*, whereby it is possible to easily detachably couple the canopy 400 to the canopy fixing pole.

The lower shaft fixing member 122 is formed at each of left and right ends of the lower end of the rear main frame in a symmetrical fashion. The front of the lower shaft fixing member 122 is coupled to a lower rear end of the side frame 130 via a rotary shaft 122*b* so as to be supported. A rear wheel 220 is coupled vertically upwards to one side of the lower end of the lower shaft fixing member 122, whereby the rear wheel is supported.

The lower shaft fixing member 122 according to the present invention is provided at one side of the lower end thereof with a cylindrical rear wheel detachment frame 122*a*, which coincides with an upper end insertion recess of the rear wheel 220, the rear wheel detachment frame 122*a* protruding in the vertical direction. A coupling pin 122*a*-1 protrudes from one side of the rear wheel detachment frame 112*a*.

The rear wheel detachment frame 122*a*, which is a frame that is formed at one side of the lower end of the lower shaft fixing member 122 in the vertical direction and that has a circularsection, is inserted into the upper end insertion recess of the rear wheel. The push button type coupling pin 122*a*-1 is inserted into the insertion recess 221*a* of the rear wheel in order to detachably couple the rear wheel 220.

Since the rear wheel 220 is easily detached, as described above, the baby wagon may be easily carried and stored when the baby wagon is not used, and partial replacement is possible when the rear wheel 220 is worn or damaged, whereby maintenance of the baby wagon is easily performed.

The main support frame 123, which is a frame coupled to the upper shaft fixing member 121 and the lower shaft fixing member 122, which are formed in left-right symmetry, so as to have a quadrangular shape, serves to generally support the rear main frame 120.

The rear handle frame 124 is coupled to the left rear and the right rear of the main support frame 123 in an upright state, and a handle structure is formed at the upper end of the rear handle frame 124.

A rotary shaft 124*a*-2 is formed at each of the left and right upper ends of the rear handle frame 124 in a symmetrical fashion, and a rotation control button 124*a*-1 is formed at the outside of the rotary shaft 124*a*-2 to adjust and fix the stepwise angle of a rear angle adjustment handle 124*a*, which interconnects the left and right upper ends of the front handle frame 110.

The stepwise angle of the rear angle adjustment handle 124*a* is adjusted by button adjustment type rotation of the rotation control button 124*a*-1, and the angle of the rear angle adjustment handle 124*a* may be set by selection of the caregiver in the state in which each of the left and right rotation control buttons 124*a*-1 is pushed.

At this time, the rear angle adjustment handle 124*a* is rotatable through ten steps from an angle of 0 degrees, at which the front angle adjustment handle 114*a* is folded in a state of being parallel to the main support frame, to an angle of 180 degrees, at which the front angle adjustment handle 114*a* is upright in the opposite direction.

The rear angle adjustment handle 124*a* may be rotated stepwise to predetermined angles, and the angle of the rear angle adjustment handle 124*a* may be changed depending on the height of the caregiver, and the position of the arms of the caregiver, an uphill road, a downhill road, movement of the baby wagon by pulling of the rear angle adjustment handle 124*a* in front of the front angle adjustment handle 114*a*, or movement of the baby wagon by pushing of the rear angle adjustment handle 124*a*, whereby force applied to the arms of the caregiver may be minimized. In the folding mode, the rear angle adjustment handle 124*a* may be disposed parallel to the main support frame 123, whereby the volume of the baby wagon may be minimized.

Also, in the case in which the angle of the rear angle adjustment handle 124*a* is set to an angle of 90 degrees, which becomes a right angle in an outward direction, when the baby wagon is moved by pushing the rear angle adjustment handle 124*a*, the distance between the feet of the caregiver and the baby wagon is maximized, whereby it is possible to prevent a kickback phenomenon in which the foot of the caregiver, which steps forwards when the caregiver walks, collides with the baby wagon, thereby enabling the caregiver to walk comfortably and improving the ride comfort of the baby.

Third, the side frame 130 according to the present invention will be described.

The side frame 130 is coupled to the left and right ends of the front main frame 110 and the rear main frame 120 in a symmetrical fashion so as to be supported, and is folded through a rotary shaft structure.

The side frame 130 includes a side upper frame 131, a side lower frame 132, and a vertical connection frame 133.

The side upper frame 131, which is a frame having a front-rear symmetry hinge structure of the upper end of the side frame 130, is axially coupled to the upper end of the front main frame 110 and the upper end of the rear main frame 120 therebetween so as to be rotated and fixed in a symmetrical fashion based on the vertical connection frame located at the middle thereof.

Figure 26:
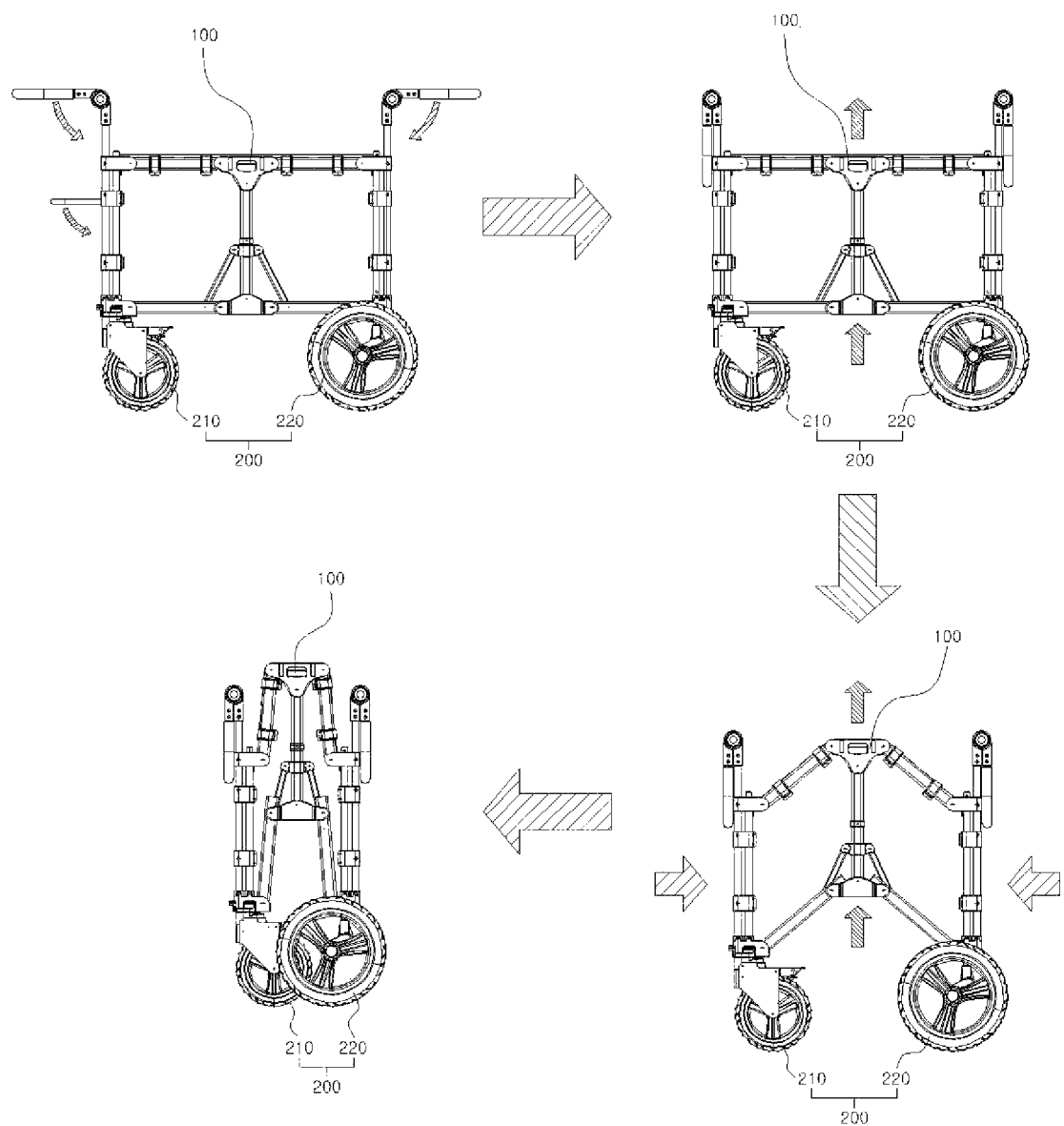
FIG. 26 is a view showing the folding sequence of the foldable main body frame from the state in which the foldable main body frame is unfolded to the state in which the foldable main body frame is folded in a lateral direction in accordance with the present invention.

As shown in FIG. 26, the front frames and the rear frames are fixed in a state of being horizontally disposed in a baby wagon usage mode, and the front frames and the rear frames are fixed in a state of being vertically upright in the baby wagon folding mode.

A tray 310 and a chair seat 320 are detachably coupled to the side upper frame 131 according to the present invention.

The tray 310, which has a quadrangular tray shape, is provided at left and right outer surfaces thereof with fixing clips 311, which are formed so as to extend vertically downwards in a symmetrical fashion and by which the tray is detachably coupled to the side upper frame 131 having the left-right symmetry structure.

The chair seat 320, which has a backrest chair shape formed at the front and the rear so as to face each other, is provided at left and right outer surfaces thereof with fixing clips 321, which are formed so as to extend vertically downwards in a symmetrical fashion and by which the chair seat is detachably coupled to the front and the rear of the side upper frame 131 having the left-right symmetry structure.

The side lower frame 132, which is a frame having a front-rear symmetry hinge structure of the lower end of the side frame 130, is axially coupled to the lower end of the front main frame 110 and the lower end of the rear main frame 120 therebetween so as to be rotated and fixed in a symmetrical fashion based on the vertical connection frame 133 located at the middle thereof.

As shown in FIG. 26, the front frames and the rear frames are fixed in a state of being horizontally disposed in the baby wagon usage mode, and the front frames and the rear frames are fixed in a state of being vertically upright in the baby wagon folding mode.

A support frame 132a is integrally coupled to left and right insides of the front and the rear of the side lower frame 132 to support the lower end of the seat 300.

In the above structure, the side lower frames 132 having the left-right symmetry structure may be integrally connected to each other without provision of a separate lower end frame capable of support the lower end of the foldable main body frame 100, whereby the baby wagon 1 may be manufactured in the state in which the number of the frames for the baby wagon is minimized, and therefore it is possible to reduce the overall weight of the baby wagon and to reduce production cost of the baby wagon. In addition, the left and right frames may be integrally coupled to each other, whereby stability and durability of the baby wagon may be guaranteed.

The vertical connection frame 133 is a frame that is upright in the vertical direction and that has an upper link 137 formed at the upper end thereof and a lower link 135 formed at the lower end thereof. The upper end and the lower end of the vertical connection frame 133 are coupled to inside rotary shafts of the side upper frame 131 and the side lower frame 132 through link structures in the forward-rearward direction to support the rotation of the side upper frame and the side lower frame 132.

In particular, the side upper frame 131 includes a front side upper frame connected to one end (front end) of the upper link 137 by a hinge and a rear side upper frame connected to another end (rear end) of the upper link 137 by another hinge, such that the front and rear side upper frames can rotate about the respective hinges.

Further, the side lower frame 132 includes a front side lower frame connected to one end (front end) of the lower link 135 by a hinge and a rear side lower frame connected to another end (rear end) of the lower link 135 by another hinge, such that the front and rear side lower frames can rotate about the respective hinges.

The vertical connection frame 133 according to the present invention is provided with a folding handle 133a, which is a sliding type handle formed at the outside of the upper link 137. When the folding handles 133a located in left-right symmetry are simultaneously pulled to move the vertical connection frame 133 upwards, a locking protrusion 133a-1 protruding from the lower end thereof is moved inwards and thus is separated from an auxiliary link frame 134, whereby the auxiliary link frame 134 is folded while the locking thereof is released. When the folding handles 113a are released, the locking protrusion 133a-1 returns to the original position thereof and thus is coupled to the inside of the auxiliary link frame 134, whereby the auxiliary link frame is locked and fixed.

As a result, it is possible to easily fold or unfold the baby wagon 1, and therefore it is possible for the caregiver alone to change the shape of the baby wagon in order to use or store the baby wagon. Since both hands of the caregiver must be simultaneously used in order to fold or unfold the baby wagon, it is possible to prevent the hands or fingers of the caregiver from being caught between the frames.

The side frame 130 according to the present invention includes an auxiliary link frame 134 having a front link frame, a rear link frame and a middle link 136. One end of the front link frame is connected to one end (front end) of the middle link 136 by a hinge, and another end of the front link frame is connected to the front side lower frame by another hinge; and one end of the rear link frame is connected to another end (rear end) of the middle link 136 by a hinge and another end of the rear link frame is connected to the rear side lower frame by another hinge, such that the front and rear link frames are rotatable about the respective hinges and about the respective front and rear side lower frames.

Further, the middle link 136 is disposed between the upper link 137 and the lower link 135, and has a through hole in the middle thereof. The vertical connection frame 133 penetrates the through hole, and can be slidable through the middle link 136. In other words, the middle link 136 is movable upwards and downwards along the vertical connection frame 133.

In one embodiment, each of the front and rear link frames of the auxiliary link frame 134 is one frame, one rod or one link directly connected to the middle link 136 and to the respective front and rear side lower frames. In other words, the respective link frame is not composed of two or more links or frames connected with each other, but one element. In another embodiment, the respective link frame can include two or more links connected with other.

The auxiliary link frame 134 provides auxiliary support to the side lower frame 132.

Figure 19:
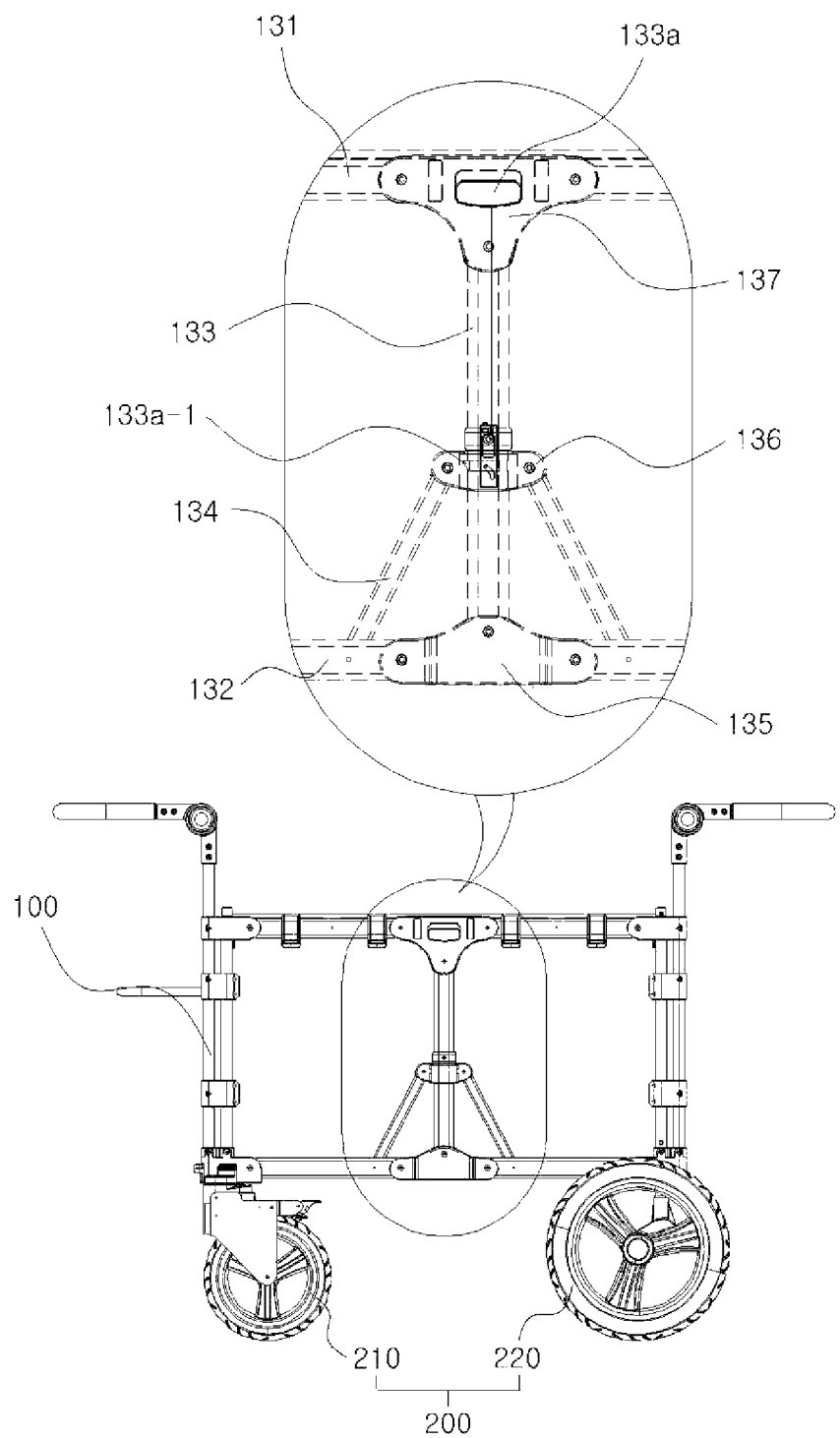
FIG. 19 is a partial enlarged view showing a folding handle formed at the outside of a vertical connection frame according to the present invention and a locking protrusion formed in the vertical connection frame.
Figure 20:
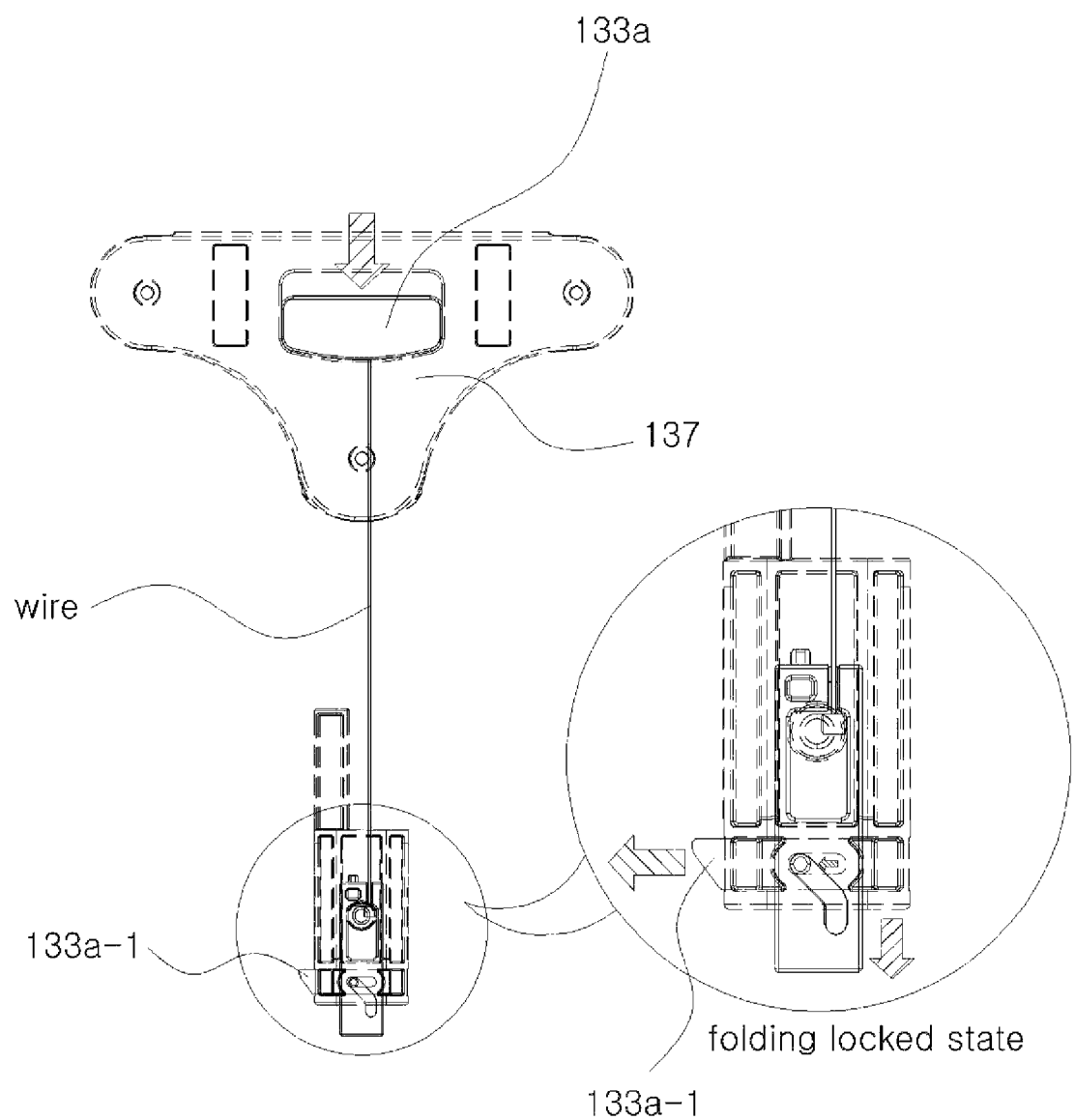
FIG. 20 is a view showing connection between the folding handle and the locking protrusion according to the present invention via a wire with a partial enlarged view showing a folding locking state in which the locking protrusion protrudes in an outward direction.

In the baby wagon usage mode, as shown in FIG. 19, the locking protrusion 133a-1 formed at the inside of the vertical connection frame 133 is inserted and coupled into a recess formed in the middle link 136 of the auxiliary link frame 134, whereby the auxiliary link frame 134 prevents rotation of the side lower frame 132 and the vertical connection frame 133, to which the auxiliary link frame 134 is coupled through the link structure, such that the side lower frame 132 and the vertical connection frame 133 are fixed.

Figure 21:
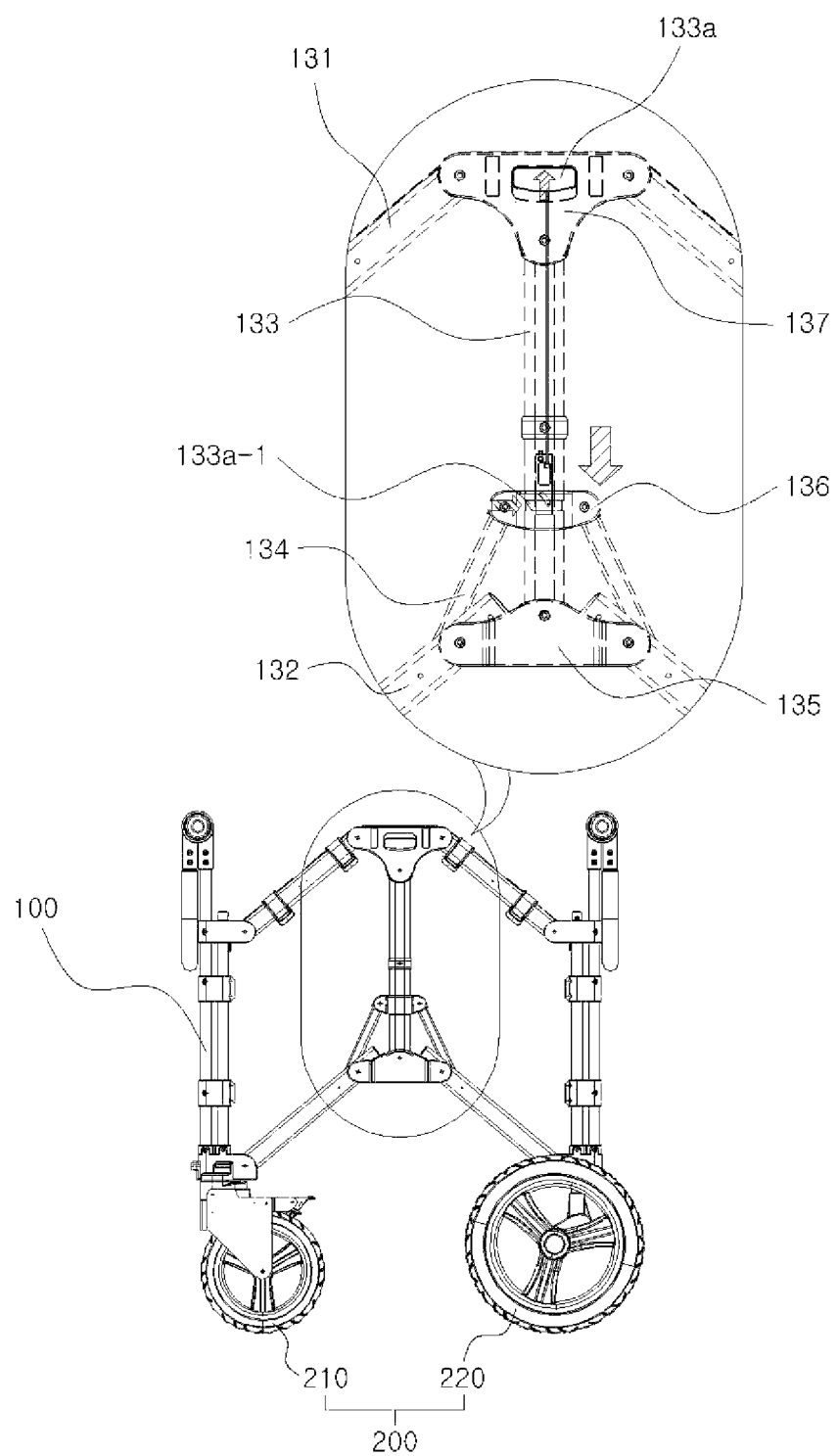
FIG. 21 is an enlarged view showing an embodiment in which the folding handle formed at the outside of the vertical connection frame according to the present invention is pulled upwards such that the locking protrusion is separated from the inside of an auxiliary link frame, whereby locking is released, and therefore a side upper frame and a side lower frame are rotated.
Figure 22:
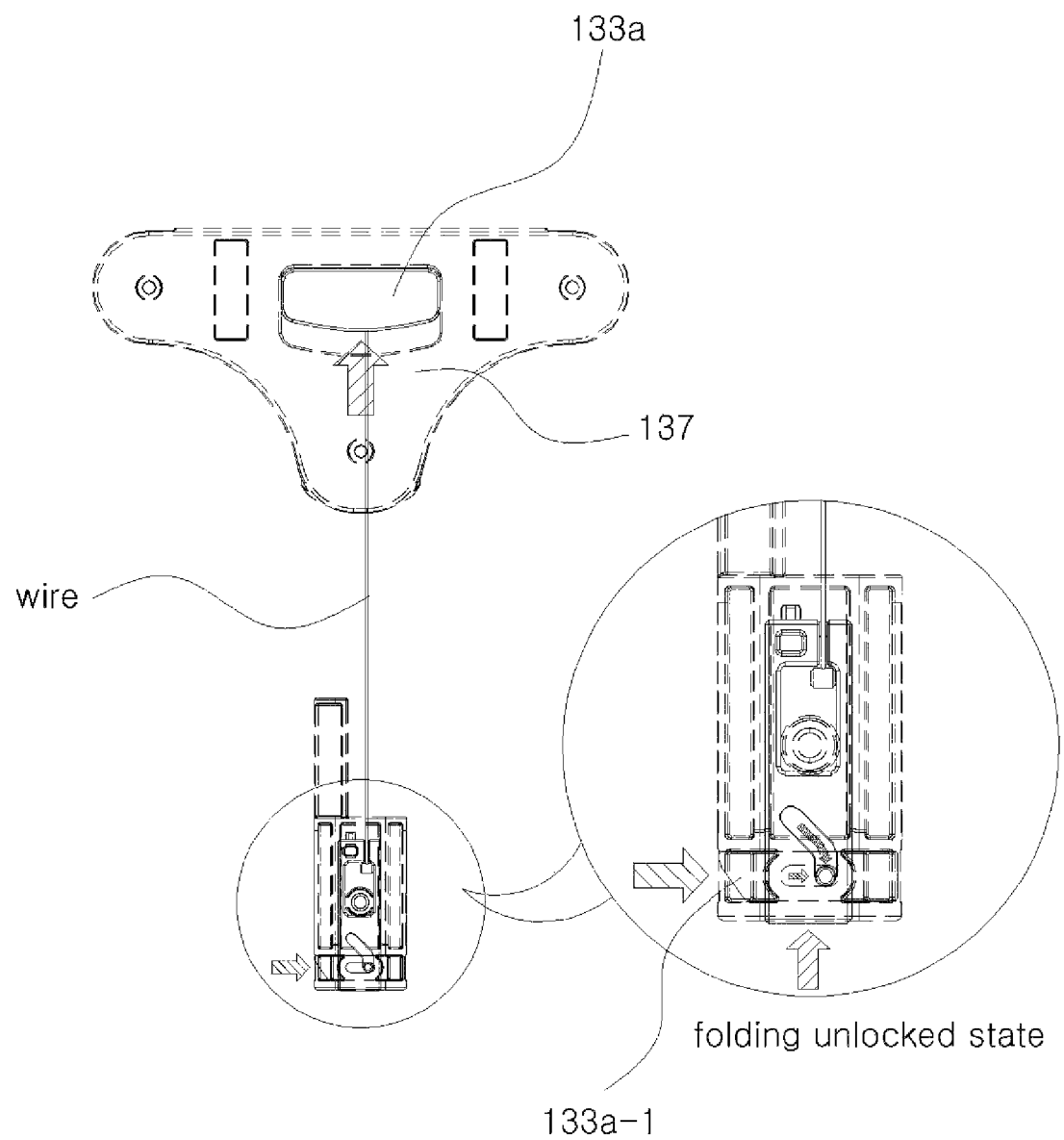
FIG. 22 is a view showing connection between the folding handle and the locking protrusion according to the present invention via the wire with a partial enlarged view showing a folding locking release state in which the locking protrusion is inserted in an inward direction.
Figure 23:
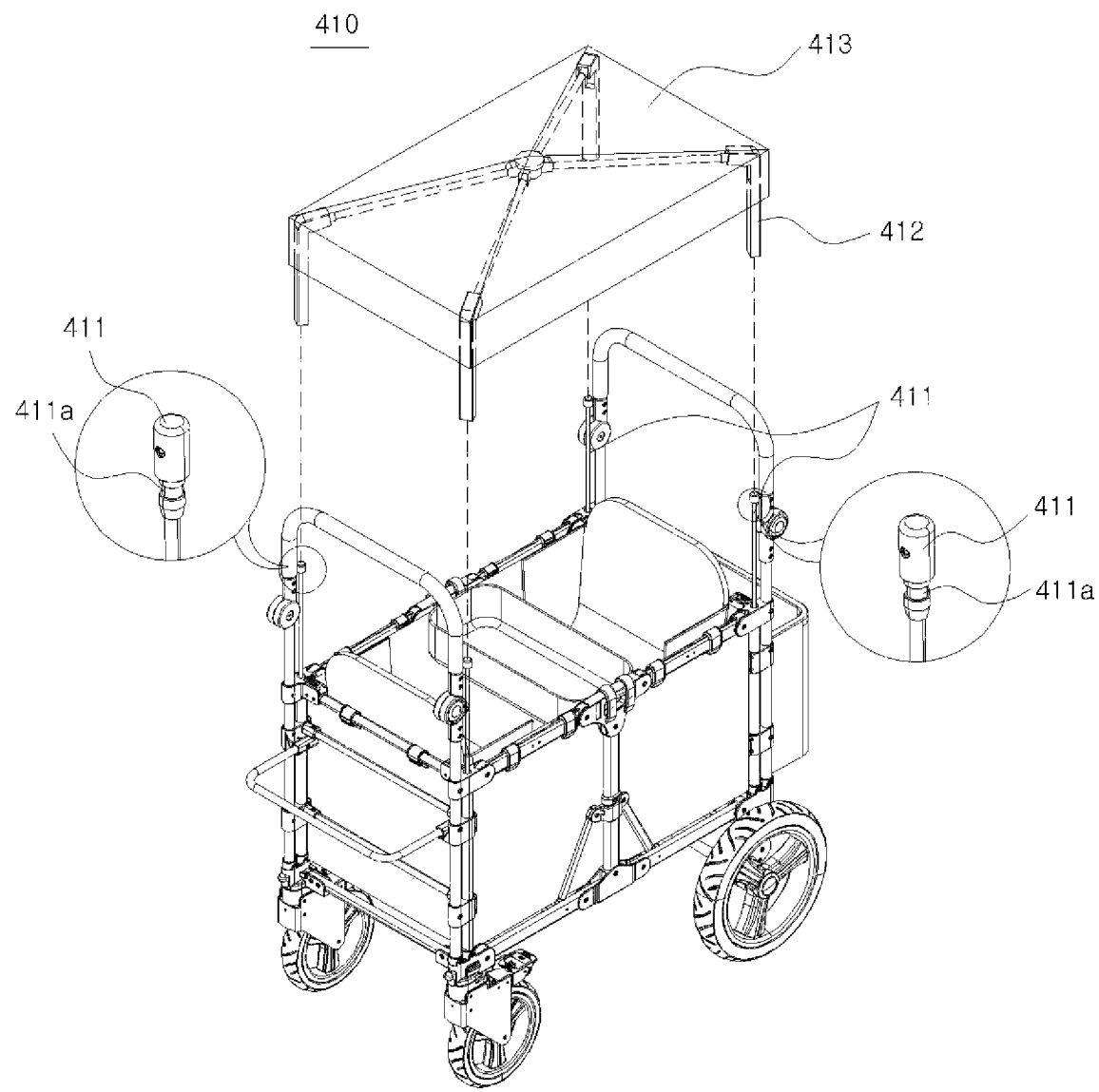
FIG. 23 is an exploded view showing coupling of the wagon canopy to the upper end of the foldable main body frame according to the present invention with a partial enlarged view showing a portion of a canopy fixing pole.

In the baby wagon folding mode, as shown in FIG. 21, the locking protrusion 133a-1 formed at the inside of the vertical connection frame 133 is detached and separated from the recess formed in the middle link 136 of the auxiliary link frame 134, whereby the auxiliary link frame 134 auxiliarily supports rotation of the side lower frame 132 and the vertical connection frame 133, to which the auxiliary link frame 134 is coupled through the link structure.

In the baby wagon usage mode, as described above, the auxiliary link frame 134 prevents rotation of the side lower frame 132 and the vertical connection frame 133, to which the auxiliary link frame 134 is coupled through the link structure, and disperses load intensively applied downwards to the middle of the side lower frame 132 in the forward-rearward direction, whereby stability and durability of the baby wagon are guaranteed while allowable boarding load is increased.

Also, in the baby wagon folding mode, the auxiliary link frame 134 auxiliarily supports rotation of the side lower frame 132 and the vertical connection frame 133, to which the auxiliary link frame 132 is coupled through the link structure, and prevents breakage of or damage to the frames coupled through the link structure.

In the auxiliary link frame 134 according to the present invention, the side upper frames 131, which are located in the front of the vertical connection frame 133 and at the rear of the vertical connection frame 133, are rotated at the same rotational speed when switching between the baby wagon usage mode and the baby wagon folding mode is performed.

As a result, the front and rear side upper frames 131 are prevented from being asymmetrically rotated through the link structure when switching between the modes of the baby wagon 1 is performed, whereby stability of the baby wagon may be guaranteed when the baby wagon is folded or unfolded, and primary rotation of the side upper frame 131 and the side lower frame 132 through the link structure and secondary rotation of the auxiliary link frame through the link structure are simultaneously performed, whereby the shape of the baby wagon may be smoothly changed.

Also, even in the baby wagon usage mode, the side lower frame 132, which is horizontally disposed so as to have a front-rear symmetrical structure, is auxiliarily supported, whereby stability and durability of the baby wagon may be guaranteed.

Next, the wagon wheel assembly 200 according to the present invention will be described.

The wagon wheel assembly 200 is fastened to the front lower end and the rear lower end of the foldable main body frame 100 in order to move the baby wagon.

The wagon wheel assembly 200 includes a front wheel assembly 210 and a rear wheel assembly 220.

The front wheel assembly 210, which is configured such that wheels are coupled to left and right lower ends of the front main frame so as to contact the ground, supports the front lower end of the baby wagon, is rotated under control of the caregiver, and serves to move and stop the baby wagon.

The front wheel assembly 210 includes a front wheel frame 211 and a front wheel 212.

The front wheel frame 211 is coupled to the lower end of the lower shaft fixing member 112 provided at the front of the baby wagon in left-right symmetry. A rotation fixing pin 211a is formed at the front of the middle of the upper end of the front wheel frame in an upright state, and a front wheel coupling pin 211b having a coupling pin recess 211b-1 is formed at the rear of the middle of the upper end of the front wheel frame in an upright state.

When the rotation fixing pin 211a is inserted into the rotation fixing pin insertion recess 112a-1 formed in the front side of the lower end of the lower shaft fixing member 112, a straight movement mode in which the front wheel assembly 210 is not rotated in the horizontal direction is set. When the rotation fixing pin 211a is detached from the rotation fixing pin insertion recess 112a-1, a direction changing mode in which the front wheel assembly 210 is rotatable 360 degrees in the horizontal direction is set.

When the front wheel detachment bar inside the coupling pin recess 112b-1 formed in the rear side of the lower end of the lower shaft fixing member 112 is inserted into the coupling pin recess 211b-1 formed in one side of the upper end of the front wheel coupling pin 211b, the front wheel 210 is coupled to the foldable main body frame 100. When the front wheel detachment bar is detached from the coupling pin recess 211b-1, the front wheel assembly 210 is separated from the foldable main body frame 100.

Left and right rotary shafts of the front wheel 212 are coupled to a lower end shaft of the front wheel frame so as to be rotatable, whereby the baby wagon may be moved.

The rear wheel assembly 220, which is configured such that wheels are coupled to left and right lower ends of the rear main frame 120 so as to contact the ground, supports the rear lower end of the baby wagon, and serves to move and stop the baby wagon under control of the caregiver.

The rear wheel assembly 220 includes a rear wheel frame 221, a rear wheel shaft 222, and a rear wheel 223.

The rear wheel frame 221 is coupled to left and right sides of the rear lower end of the lower shaft fixing member 122 in a symmetrical fashion, and serves to generally support the rear wheel assembly 220.

The rear wheel shaft 222 is a round bar axially coupled to the rear frames formed at the left and right sides in a symmetrical fashion therebetween. A brake 222a is coupled to the middle of the rear wheel shaft 222.

When the caregiver presses the brake 222a, the brake is rotated about the rear wheel shaft 222, whereby rotation of the rear wheel 223 is interrupted. When the caregiver releases the brake 222a, the brake returns to the original position thereof about the rear wheel shaft 222, whereby rotation of the rear wheel 223 is allowed.

Left and right rotary shafts of the rear wheel 223 are coupled to a lower end shaft of the rear wheel frame so as to be rotatable, whereby the baby wagon may be moved.

Next, the seat 300 according to the present invention will be described.

The seat 300 is formed in the shape of a rectangular basket. The seat 300 is coupled and fixed to the inner circumference and the lower end of the foldable main body frame 100 using snap fasteners, buckles, or Velcro members. The seat 300 serves to provide a space in which the baby can comfortably rest in the baby wagon.

A five-point coupling type safety belt is formed at the front and the rear of the inside of the seat 300 according to the present invention so as to face the same, whereby the shoulders, the waist, and the thighs of the baby are supported so as not to shake.

The five-point coupling type safety belt surrounds the entirety of the upper body. Consequently, babies and children of various ages, including babies who cannot keep themselves steady and children, can ride in the baby wagon.

The tray 310 and the chair seat 320 are detachably coupled to the seat 300 according to the present invention.

The tray 310, which has a quadrangular tray shape, is provided at left and right outer surfaces thereof with fixing clips 311, which are formed so as to extend vertically downwards in a symmetrical fashion and by which the tray 310 is detachably coupled to the side upper frame 131 having the left-right symmetry structure.

A fixing recess 311a is formed in the middle of the outside of each fixing clip 311, the fixing clip 311 is coupled to one side of the side upper frame 131 having the left-right symmetry structure, and an anti-slip pin 131a protruding from one side of the side upper frame 131 is fixed to the fixing recess 311a.

When the anti-slip pin 131a is inserted into the fixing recess 311a of the tray 310, which is fastened to the left and right sides of the side upper frame in a clip fashion is prevented from being slid in a longitudinal direction of the side upper frame 131, whereby the tray 310 may be stably fixed.

As a result, it is possible to prevent articles, toys, or food on the tray 310 from shaking or falling therefrom.

The chair seat 320, which has a backrest chair shape formed at the front and the rear so as to face each other, is provided at left and right outer surfaces thereof with fixing clips 321, which are formed so as to extend vertically downwards in a symmetrical fashion and by which the chair seat 320 is detachably coupled to the front and the rear of the side upper frame 131 having the left-right symmetry structure.

The chair seat 320 according to the present invention is provided with a fixing recess 321*a* formed in the middle of the outside of each fixing clip 321. The anti-slip pin 131*a* protruding from the outside of the side upper frame 131 at one side of the front and the rear is inserted into and fixed to the fixing recess 321*a*.

Any one of a plurality of anti-slip pins 131*a* formed at the outside of the side upper frame 131 in left-right symmetry in the longitudinal direction is inserted into the fixing recess 321*a*.

When the anti-slip pin 131*a* of the side upper frame 131 is inserted into the fixing recess 321*a*, the chair seat 320 fastened to the left and the right sides of the side upper frame 131 in a clip fashion is prevented from sliding in the longitudinal direction of the side upper frame 131, whereby a front chair seat and a rear chair seat of the chair seat 320 may be stably fixed.

In addition, a five-point coupling type safety belt is applied to the chair seat 320 according to the present invention.

The chair seat 320 according to the present invention includes a fixing clip 321 and a fixing belt 322.

The fixing clip 321 has a length adjustment portion 321*b* formed at a strap belt vertically formed at the left and right outsides of the chair seat 320 in the downward direction in a symmetrical fashion, whereby the height of the chair seat may be adjusted, and the fixing clip 321 is fixed to the end of the strap belt, whereby the chair seat 320 is primarily coupled to the side upper frame 131.

The fixing belt 322 is a strap belt including male and female buckles 322*a* and a length adjustment portion 322*b* formed at the middle and the lower end of the rear of the chair seat 320 in the vertical direction. The backrest angle of the chair seat 320 is adjusted by length adjustment of the length adjustment portion, and the fixing belt is secondarily coupled to the rear main frame 120.

As described above, sliding of the chair seat 320 in the forward-rearward length direction of the baby wagon is prevented, biasing of the chair seat 320 to one side is prevented, stable seating of the baby in the chair seat 320 is possible, and the baby is fixed in a stable and comfortable pose through the five-point coupling type safety belt, whereby the baby in the chair seat may keep a stable pose even when the baby wagon is shaken or even when external impact is applied to the baby wagon, and therefore the ride comfort of the baby may be improved.

In addition, the height of the chair seat 320 fixed in the foldable main body frame 100 and the backrest angle of the chair seat 320 may be easily adjusted, whereby the baby may keep a comfortable pose depending on physical conditions of the baby, such as age and physical growth of the baby, and therefore the ride comfort of the baby may be improved. As a result, satisfaction of the baby and the caregiver when using the baby wagon may be improved.

Next, the canopy 400 according to the present invention will be described.

The canopy 400 is detachably coupled to the upper end of the foldable main body frame 100, and serves to protect the baby from an external environment, such as sunlight, rain, or wind.

The canopy 400 includes a wagon canopy 410 and a baby carrier canopy 420.

The wagon canopy 410 is formed so as to have rectangular sides and a quadrangular pyramid-shaped roof, and is detachably coupled to the upper end of the foldable main body frame 100. The wagon canopy 410 includes a canopy fixing pole 411, a canopy frame 412, and a canopy sheet 413.

The canopy fixing pole 411 is a round-bar-shaped pole disposed in an upright state. The canopy fixing pole 411 is vertically inserted into a pole insertion hole 111*a* formed in the upper end of each of the left and right upper shaft fixing members 111 of the front main frame 110, and is vertically inserted into a pole insertion hole 121*a* formed in the upper end of each of the left and right upper shaft fixing members 121 of the rear main frame 120. The canopy fixing poles are arranged so as to have a quadrangular structure.

When the inside frames of the pole fixing switches are fixed to the upper end pole fixing recesses in the state in which the canopy fixing poles 411 are withdrawn upwards by the pole fixing switches 111*b* and 121*b* located at the upper ends of the upper shaft fixing members 111 and 121, a wagon canopy coupling mode is formed. When the inside frames of the pole fixing switches are fixed to the lower end pole fixing recesses in the state in which the canopy fixing poles 411 are pulled downwards, a wagon canopy removal mode is formed.

The canopy frame 412 is configured such that X-shaped central axis frames form a quadrangular pyramid-shaped inclined surface at the center of the upper end of the canopy frame and such that the end of each frame is formed so as to face vertically in the downward direction while having a hinge structure. The end of each frame is coupled to the canopy fixing pole 411. When the canopy 400 is installed, therefore, the canopy frame serves to maintain the shape of the canopy sheet 413.

The canopy sheet 413 is supported by the canopy frame 412 in order to cover the upper end of the baby wagon such that the upper end of the baby wagon is not exposed to the outside. Velcro tapes are provided at the inner surface of the canopy sheet coupled to the four canopy frames installed in a quadrangular pyramid shape, whereby the canopy sheet is stably fixed.

The wagon canopy 410 according to the present invention generally covers the upper end of the foldable main body frame 100.

As a result, it is possible to protect the baby in the baby wagon from an external environment, such as sunlight, rain, or wind, while providing comfort to the baby.

The baby carrier canopy 420 is configured such that baby carrier canopy roofs are detachably coupled to the front and the rear of the upper end of the foldable main body frame 100 in a symmetrical fashion in the inward direction. The baby carrier canopy 420 includes a canopy support frame 421 and a canopy rotary shaft frame 422.

The canopy support frame 421 is a frame, which is upright in left-right symmetry, the upper end of which is angled, and which is horizontally connected. A sliding recess frame 421*a* having a sliding recess 421*a*-1 is formed at each of the rear surfaces of the left and right lower ends of the canopy support frame 421, and an insertion recess 421*a*-2 is formed in the lower end of the sliding recess 421*a*-1, whereby the canopy support frame 421 is detachably coupled to one side of the front main frame 110 and one side of the rear main frame 120 in order to support the baby carrier canopy 420.

Figure 24:
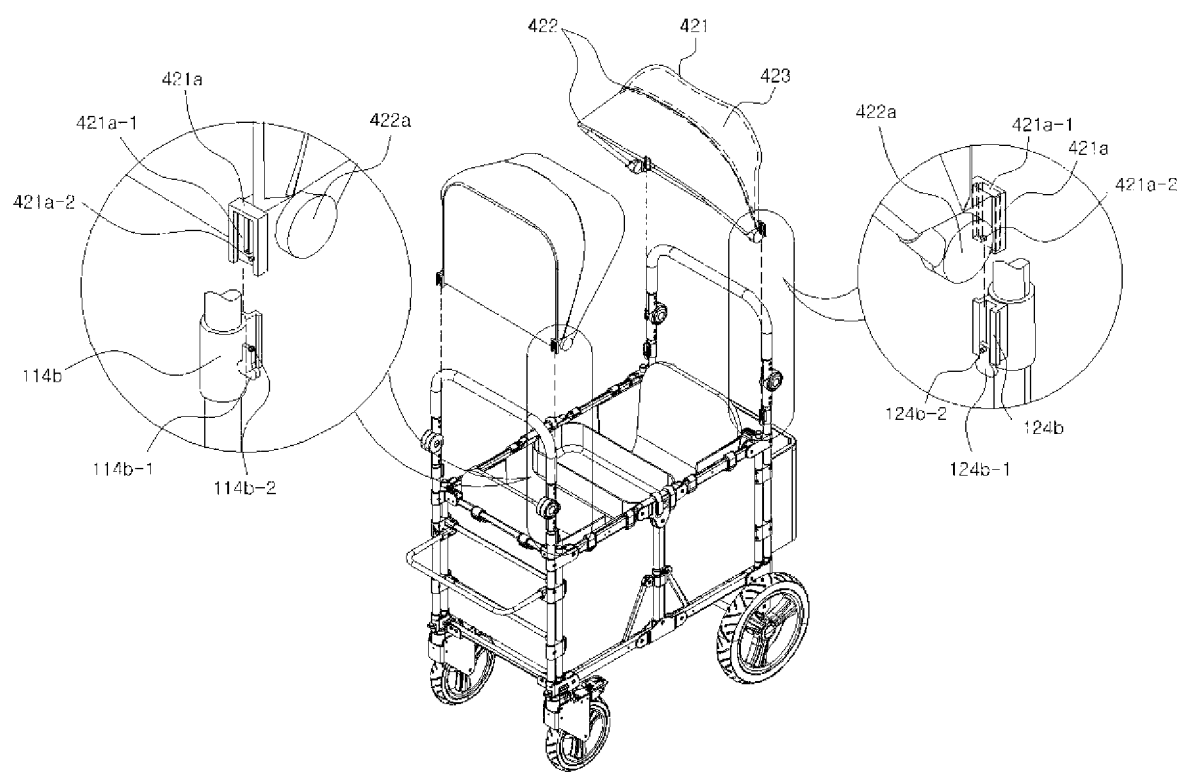
FIG. 24 is an exploded view showing coupling of a baby carriage canopy to the upper end of the foldable main body frame according to the present invention with a partial enlarged view showing the coupled portions therebetween.
Figure 25:
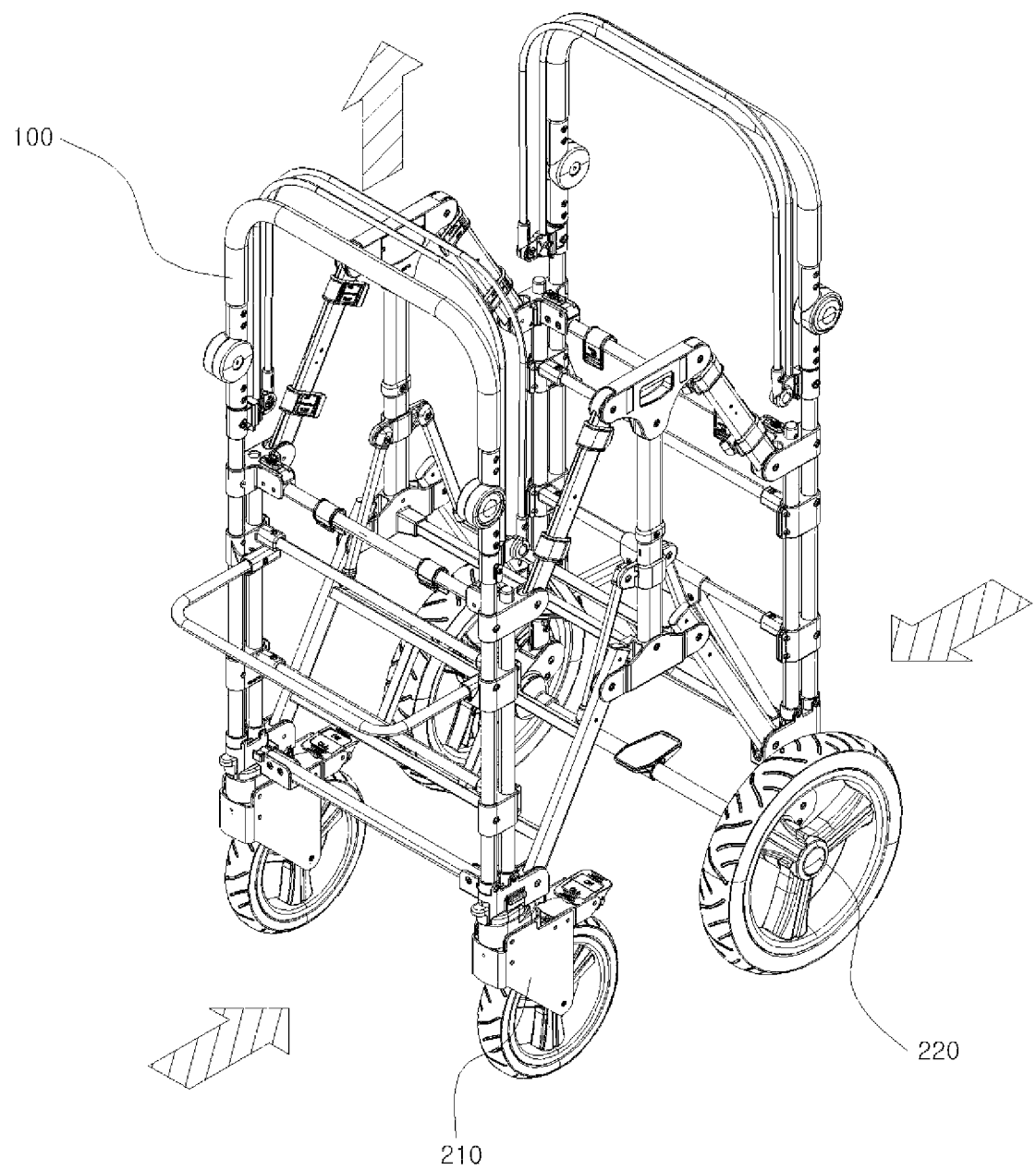
FIG. 25 is an exploded view showing an embodiment in which the foldable main body frame according to the present invention is unlocked and the vertical connection frame is folded while moving upwards.

As shown in FIG. 24, the sliding recess 421*a*-1 is a recess formed vertically in the rear surface of the lower end of the sliding recess frame 421*a*. When a protrusion 114*b*-2 formed on the upper end of a detachment switch 114*b*-1 is inserted into the insertion recess 421*a*-2 in the state in which a sliding protrusion frame 114*b* formed at each of the left and right sides of the rear surface of the upper end of the front handle frame 114 is inserted, a front baby carrier canopy is coupled. When a protrusion 124*b*-2 formed on the upper end of a detachment switch 124*b*-1 is inserted into an insertion recess 421*b*-2 in the state in which a sliding protrusion frame 124*b* formed at each of the left and right sides of the front surface of the upper end of the rear handle frame 124 is inserted, a rear baby carrier canopy is coupled.

The canopy rotary shaft frame 422 is unfolded in a fan shape or folded based on a rotary shaft 422*a* coupled to each of the fronts of the left and right lower ends of the canopy support frame 421.

When the canopy sheet 423 is rotated upwards about the rotary shaft in the state in which the canopy sheet 423 is coupled to the fan-shaped frame, the canopy sheet 423 is folded, whereby the upper end of the baby wagon is opened. When the canopy sheet 423 is rotated downwards, the canopy sheet 423 is unfolded, whereby the baby carrier canopy is formed.

The baby carrier canopy 420 according to the present invention may be individually detachably coupled to the front and the rear of the upper end of the foldable main body frame 100, and the baby carrier canopy 420 may be folded in a state of not being detached or may be used in an unfolded state as needed.

As a result, the field of vision of the baby in the baby wagon may be broadened, the caregiver and the baby may respond to each other while looking into the eyes, and the behavior of the baby may be checked with the naked eye, whereby the caregiver may have a sense of security.

Hereinafter, the operation of the baby wagon having improved convenience of use according to the present invention will be described in detail.

First, the left and right folding handles 133*a* of the vertically upright side frame of the baby wagon in the folding mode, in which the baby wagon is stored, are pulled upwards in order to release the locked state of the baby wagon, whereby the side upper frame 131 and the side lower frame 132 are horizontally unfolded.

At this time, when the left and right folding handles 133*a* are released, the locking protrusion 133*a*-1 is inserted into the locking recess of the middle link 136 of the auxiliary link frame 134, whereby the rotation of the side frame is fixed, and therefore the baby wagon usage mode is formed.

Subsequently, the chair seat 320 is coupled to the foldable main body frame 100 in consideration of the age, physical growth, and activity of the baby as needed.

At this time, the anti-slip pin of the side upper frame 131 is coupled to the fixing recess formed in the fixing clip of the chair seat 320, whereby the chair seat 320 is fixed such that the chair seat 320 is prevented from moving in the longitudinal direction of the side upper frame 131.

In addition, the height of the chair seat 320 is adjusted through the length adjustment portion of the belt connected to each of the left and right fixing clips of the chair seat 320, and the backrest angle of the chair seat 320 is adjusted through the length adjustment portion of the belt connected at the rear of the chair seat 320.

In addition, the shoulders, the waist, and the thighs of the baby are supported so as not to shake using the five-point coupling type safety belt of the chair seat 320.

As a result, the baby in the baby wagon may keep a comfortable pose, whereby the ride comfort of the baby may be improved while the baby wagon is stably moved.

Subsequently, the tray 310 is coupled to the foldable main body frame 100 as needed.

Subsequently, any one of the wagon canopy 410 and the baby carrier canopy 420 is selectively coupled to the upper end of the foldable main body frame 100.

When use of the baby wagon is completed, the baby is moved to a safe place, and the canopy 400, the tray 310, and the chair seat 320 are separated from the foldable main body frame 100.

At this time, the front wheel 210 and the rear wheel 220 may be detached from the foldable main body frame 100 as needed.

Finally, the left and right folding handles 133*a* of the baby wagon are pulled upwards to release the locked state of the baby wagon, the foldable main body frame 100 is folded such that the side upper frame 131 and the side lower frame 132 are vertically upright, and the baby wagon is stored in the folding mode, in which the volume of the baby wagon is minimized.

As is apparent from the above description, a baby wagon with improved ease of use according to the present invention has effects in that the load of frames constituting the baby wagon is dispersed, whereby the baby wagon is supported while stability and durability of the babe wagon are guaranteed, and therefore allowable boarding load is increased, in that the structure of the frames is simplified, whereby the baby wagon is easily carried and stored, in that a baby keeps a comfortable pose depending on physical conditions of the baby, such as age and physical growth of the baby, whereby the ride comfort of the baby is improved while the baby wagon is stably moved, in that the number of unnecessary frames is reduced, whereby the overall weight of the baby wagon is reduced and production cost is reduced, and therefore product competitiveness is achieved, in that a change in shape of the baby wagon through folding and unfolding of the baby wagon is easily performed by a caregiver alone, in that the canopy 400, the baby seat 300, and the tray 310 may be conveniently detachably coupled to a foldable main body frame 100, whereby caregiver manipulation is easily performed, and in that, when the baby seat 300 is coupled to the foldable main body frame 100, the baby seat 300 is stably supported, whereby babies and children of various ages can comfortably ride in the baby wagon.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A baby wagon comprising:
    a foldable main body frame including a side frame;
    a wheel assembly connected to the foldable main body frame; and
    a seat disposed on the foldable main body frame,
    wherein the side frame includes a side upper frame, a side lower frame, a connection frame for connecting the side upper frame with the side lower frame, and an auxiliary link frame connected to the connection frame and to the side lower frame and disposed between the side upper frame and the side lower frame, wherein the auxiliary link frame includes a front auxiliary link frame, a rear auxiliary link frame, and a middle link for connecting the front and rear auxiliary link frames, and wherein the middle link includes a locking protrusion protruding from an end thereof, and the upper link has a folding handle connected to the locking protrusion, such that, when the folding handle is pulled or released, the locking protrusion is configured to move to lock or unlock the auxiliary link frame.

2. The baby wagon according to claim 1, wherein the connection frame includes an upper link disposed at an upper end thereof and a lower link disposed at a lower end thereof.

3. The baby wagon according to claim 2, wherein the side upper frame includes a front side upper frame coupled to a front end of the upper link, and a rear side upper frame coupled to a rear end of the upper link.

4. The baby wagon according to claim 2, wherein the side lower frame includes a front side lower frame coupled to a front end of the lower link, and a rear side lower frame coupled to a rear end of the lower link.

5. The baby wagon according to claim 4, wherein one end of the front auxiliary link frame is connected to a front end of the middle link, and another end of the front auxiliary link frame is connected to the front side lower frame.

6. The baby wagon according to claim 4, wherein one end of the rear auxiliary link frame is connected to a rear end of the middle link, and another end of the rear auxiliary link frame is connected to the rear side lower frame.

7. The baby wagon according to claim 4, wherein the middle link has a through hole, the connection frame penetrates the through hole of the middle link, and the middle link is movable upwards and downward along the connection frame.

8. The baby wagon according to claim 1, wherein the folding handle is connected to the locking protrusion by a wire.

9. The baby wagon according to claim 1, further comprising a baby carrier canopy detachably coupled to an upper end of the foldable main body frame, wherein the baby carrier canopy is configured to be unfolded so as to have a fan-shaped side surface or to be folded, and is coupled to the foldable main body frame.

10. A baby wagon comprising:
a foldable main body frame including a side frame;
a wheel assembly connected to the foldable main body frame; and
a seat disposed on the foldable main body frame,
wherein the side frame includes a side upper frame, a side lower frame, a connection frame for connecting the side upper frame with the side lower frame, and an auxiliary link frame connected to the connection frame and to the side lower frame and disposed between the side upper frame and the side lower frame, and
wherein the connection frame includes an upper link disposed at an upper end thereof and a lower link disposed at a lower end thereof,
the baby wagon further comprising:
a tray having tray fixing clips disposed at left and right outer surfaces thereof, the tray fixing clips extending vertically downwards for detachably coupling the tray to the side upper frame; and
a pair of chair seats configured to be respectively disposed at a front and a rear potions of the seat so as to face each other, and including seat fixing clips disposed at left and right outer surfaces thereof, extending vertically downwards and configured to detachably couple the pair of chair seats to the side upper frame.

11. The baby wagon according to claim 10, wherein the respective chair seat includes a fixing recess disposed in a middle of the respective seat fixing clip, and the side upper frame includes an anti-slip pin protruding from an outside thereof, such that the anti-slip pin is insertable to the fixing recess.

12. The baby wagon according to claim 10, further comprising:
a strap belt coupled to an end of the respective seat fixing clip and a length adjustment portion disposed on the strap belt for adjusting a height of the respective chair seat and for primarily coupling the respective chair seat to the side upper frame; and
a fixing belt including a male and a female buckles and a length adjustment portion formed at a rear of the respective chair seat for adjusting a backrest angle of the respective chair seat and for secondarily coupling the respective chair seat to the foldable main body frame.

13. The baby wagon according to claim 9, wherein the baby carrier canopy comprises:
a canopy support frame including a sliding recess disposed at a lower end thereof and configured to detachably couple the canopy support frame to the foldable main body frame; and
a canopy rotary shaft frame configured to be unfolded in a fan shape or folded based on a rotary shaft coupled to the lower end of the canopy support frame.

14. A baby wagon comprising:
a foldable main body frame including a side frame;
a wheel assembly connected to the foldable main body frame; and
a seat disposed on the foldable main body frame,
wherein the side frame includes a side upper frame, a side lower frame, a connection frame for connecting the side upper frame with the side lower frame, and an auxiliary link frame connected to the connection frame and to the side lower frame and disposed between the side upper frame and the side lower frame,
the baby wagon further comprising a front main frame connected to the side frame and including an upper shaft fixing member disposed at an upper portion thereof, one end of the upper shaft fixing member being coupled to the side frame via a rotary shaft,
wherein the upper shaft fixing member includes a pole insertion hole disposed at an upper end thereof and formed vertically downwards and into which a round-bar-shaped canopy fixing pole is inserted, and further includes a pole fixing switch disposed on a side of the pole insertion hole, and the pole fixing switch is configured to move in a sliding fashion in order to fix the canopy fixing pole after the canopy fixing pole is inserted into the pole insertion hole in a vertical direction.

* * * * *